United States Patent
Pennefather et al.

(10) Patent No.: US 10,331,658 B2
(45) Date of Patent: Jun. 25, 2019

(54) SYSTEMS AND METHODS FOR ATOMIZING AND INDIVIDUATING DATA AS DATA QUANTA

(71) Applicant: GDIAL INC., Toronto (CA)

(72) Inventors: Peter Pennefather, Toronto (CA); West Suhanic, Toronto (CA)

(*) Notice: Subject to any disclaimer, the term of this patent is extended or adjusted under 35 U.S.C. 154(b) by 47 days.

(21) Appl. No.: 15/177,680

(22) Filed: Jun. 9, 2016

(65) Prior Publication Data

US 2016/0321316 A1    Nov. 3, 2016

Related U.S. Application Data

(63) Continuation-in-part of application No. 14/123,284, filed as application No. PCT/CA2012/000515 on Jun. 1, 2012, now Pat. No. 9,465,858.

(60) Provisional application No. 61/492,835, filed on Jun. 3, 2011, provisional application No. 62/173,093, filed on Jun. 9, 2015.

(51) Int. Cl.
| | |
|---|---|
| *G06F 7/00* | (2006.01) |
| *G06F 16/23* | (2019.01) |
| *G06F 16/14* | (2019.01) |
| *G06F 21/64* | (2013.01) |

(52) U.S. Cl.
CPC ........ *G06F 16/2365* (2019.01); *G06F 16/148* (2019.01); *G06F 21/64* (2013.01)

(58) Field of Classification Search
CPC ............... G06F 17/30371; G06F 21/00; G06F 17/30106; G06F 7/586; G06F 7/588; G06F 9/5066

USPC .......................... 707/694, 697, 688, 698, 701
See application file for complete search history.

(56) References Cited

U.S. PATENT DOCUMENTS

| | | | | |
|---|---|---|---|---|
| 5,261,080 | A * | 11/1993 | Khoyi | G06F 8/76 707/E17.006 |
| 5,701,400 | A * | 12/1997 | Amado | G06N 5/02 706/45 |
| 5,893,910 | A * | 4/1999 | Martineau | G06F 21/6209 |
| 6,003,043 | A * | 12/1999 | Hatakeyama | G06F 17/30011 |
| 7,043,473 | B1 * | 5/2006 | Rassool | G06F 17/30743 |

(Continued)

OTHER PUBLICATIONS

Pennefather, Peter, "Systems and Methods for Authenticating and Aiding in Indexing of and Searching for Electronic Files", U.S. Appl. No. 14/123,284, filed Dec. 2, 2013.

*Primary Examiner* — Mohammed R Uddin
(74) *Attorney, Agent, or Firm* — Elias Borges

(57) ABSTRACT

The present specification provides a method comprising: providing a value file containing a value entry associated with a recording event and a recording record file containing a recording record entry associated with the value entry and also with the recording event. The method also comprises, at a computing device, associating in a data quantum file the value entry with the corresponding recording record entry; generating a data quantum unique identifier by applying an algorithm to the data quantum file such that any change to the value entry or the recording record entry produces a corresponding change to the data quantum unique identifier according to the algorithm; and associating in a registration file the data quantum unique identifier and a data quantum file locator. The data quantum unique identifier allows for detecting alterations of any one of the value entry and the recording record entry.

14 Claims, 15 Drawing Sheets

Data Quantum
Specific data recording event associated with a specific value output and recording record

Analog Data Quantum for Recording Event 20

Types of Digital Files Used in Systems & Methods
These files can be, but are not limited to, generic archive or tar file formats or can be formatted to accommodate specific types of data ○ Value File ▭ Recording Record File ▭ Data Quantum (DQ) File ○ Unique Identifier (UID) File ▭ Registration (DQR) File ▣ Hyper Data Quantum (HDQ) File ✦ Blocks of Data Quanta Files

(56) References Cited

U.S. PATENT DOCUMENTS

| | | | | |
|---|---|---|---|---|
| 8,615,404 | B2* | 12/2013 | Karkanias | G06Q 50/22 |
| | | | | 705/2 |
| 8,675,980 | B2* | 3/2014 | Liege | G06T 1/0007 |
| | | | | 382/167 |
| 9,762,635 | B2* | 9/2017 | Sebastian | H04L 65/4076 |
| 2003/0118218 | A1* | 6/2003 | Wendt | G06K 9/0008 |
| | | | | 382/124 |
| 2003/0212654 | A1* | 11/2003 | Harper | G06Q 30/02 |
| 2004/0122851 | A1* | 6/2004 | Kinno | G06F 17/2247 |
| 2005/0080823 | A1* | 4/2005 | Collins | G06F 17/30176 |
| 2005/0114363 | A1* | 5/2005 | Borthakur | G06F 17/30067 |
| 2005/0114658 | A1* | 5/2005 | Dye | G06F 21/55 |
| | | | | 713/165 |
| 2005/0160109 | A1* | 7/2005 | Sato | G06F 17/30011 |
| 2006/0184566 | A1* | 8/2006 | Lo | G06F 17/30038 |
| 2006/0277154 | A1* | 12/2006 | Lunt | G06F 17/30616 |
| 2007/0112714 | A1* | 5/2007 | Fairweather | G06F 8/427 |
| | | | | 706/46 |
| 2008/0243752 | A1* | 10/2008 | Gormish | G06F 17/30011 |
| 2008/0318678 | A1* | 12/2008 | Stivoric | G06F 19/3443 |
| | | | | 463/36 |
| 2010/0070448 | A1* | 3/2010 | Omoigui | H01L 27/1463 |
| | | | | 706/47 |
| 2011/0078458 | A1* | 3/2011 | Furukawa | G06F 21/64 |
| | | | | 713/189 |
| 2012/0284259 | A1* | 11/2012 | Jehuda | G06F 17/30734 |
| | | | | 707/722 |
| 2016/0092642 | A1* | 3/2016 | Maurer | G06F 19/328 |
| | | | | 705/3 |

* cited by examiner

Data Quantum

Specific data recording event associated with a specific value output and recording record

Analog Data Quantum for Recording Event 20

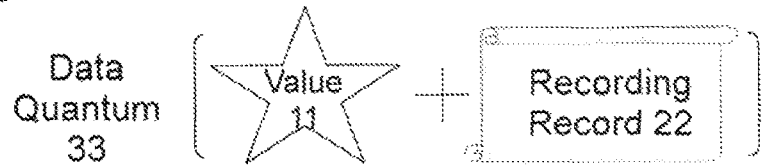

Data Quantum 33 { Value 11 + Recording Record 22 }

Types of Digital Files Used in Systems & Methods

These files can be, but are not limited to, generic archive or tar file formats or can be formatted to accommodate specific types of data ○ Value File ⬭ Recording Record File ▭ Data Quantum (DQ) File ⬠ Unique Identifier (UID) File ▢ Registration (DQR) File ▣ Hyper Data Quantum (HDQ) File ✳ Blocks of Data Quanta Files

Fig. 1

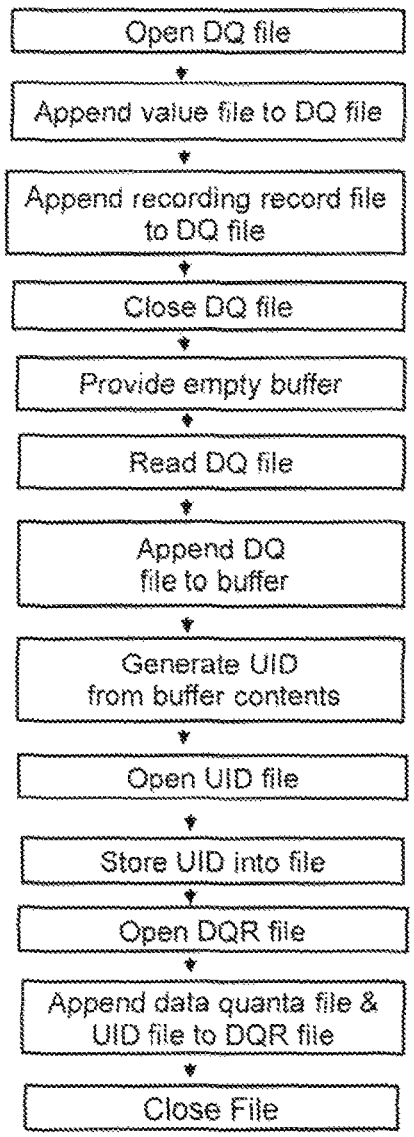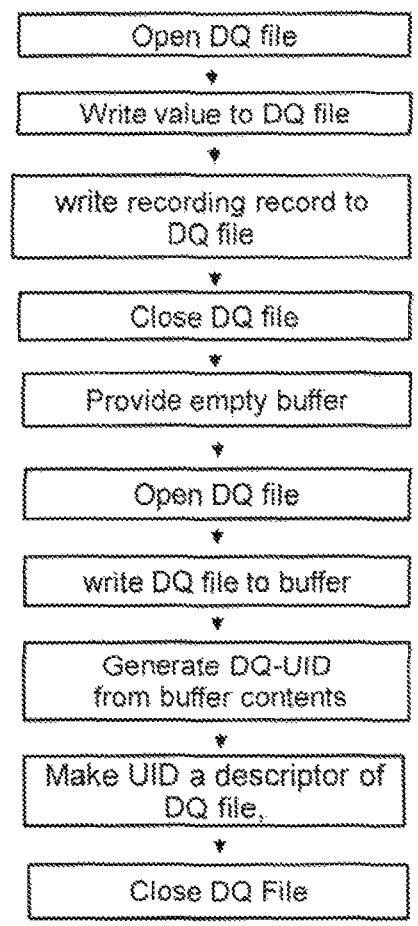
Fig. 4

1. Populate List data structure with value and recording record files. Each entry in this list specifies a value file and accompanying recording record file(s)

2. Iterate over List populated in step 1 above.

3. Encode all files in list entry to protect special characters.

4. Populate Map data structure using the value file as the key and the recording record files as the accompanying key entry.

4-1. Iterate over populated Map structure 4-2-a. Get key value from Map which is the value file name 4-2-b. Create data quantum file name from value file name 4-2-c. Open data quantum file 4-2-d. Add value file to data quantum file 4-2-e. Get accompanying recording record files from Map 4-3-a. Iterate over set of recording record files 4-3-b. Insert recording record files into data quantum file 4-2-f. Close data quantum file 4-4 Calculate DQ-UID from data quantum file bytes 4-5 Write out DQ-UID and data quantum file name to data quanta registration file

Fig. 7

Data Centric Ato-Publication Products

IOAA: Inside-Out-Assay Article
Hyper Data quanta where each subsidiary data quanta represents values generated by a given assay under different contexts with each subsidiary data quanta associated with an indexed registration file.

STATs: Systematic Translation of Assay Trials
Structured summaries of a variety of IOAAs exploring assay reliability, reproducibility, resiliency and adaptability.

BASH: Build Assay Stories Here
Interactive web site enabling contributors to use IOAA and STATs findings to justify contributor instantiated modification of assay protocols demonstrating improvements over best practices.

ACT: Assay Coherence Transactions
Dialogue between authors, reviewers and editors concerning IOAA, STATs and BASH publications leads to a proposed reconsolidation of assay best-practices published as a hyperdata quanta.

Fig. 11

SYSTEMS AND METHODS FOR ATOMIZING AND INDIVIDUATING DATA AS DATA QUANTA

CROSS-REFERENCE TO RELATED APPLICATIONS

This application is a continuation-in-part of U.S. patent application Ser. No. 14/123,284, and published as US 2014/0122491, which is incorporated herein by reference in its entirety. U.S. Ser. No. 14/123,284 is a national phase entry of PCT Application No. PCT/CA2012/000515, filed on Jun. 1, 2012, which in turn claims priority from U.S. Provisional Patent Application No. 61/492,835, filed on Jun. 3, 2011. Both PCT Application No. PCT/CA2012/000515 and U.S. Provisional Patent Application No. 61/492,835 are incorporated herein by reference in their entirety.

This application also claims priority from U.S. Provisional Patent Application No. 62/173,093 filed on Jun. 9, 2015, which is incorporated herein by reference in its entirety.

FIELD

The present specification relates to information management systems and methods, and in particular to systems and methods for authenticating and atomizing electronic files.

BACKGROUND

With the proliferation of digital information and communication means, including global, local, and personal data networks for communicating that information, there is an increasing need for methods and systems that can render such communications more secure and more efficient. There is a need for systems and methods that provide data security. Data security can comprise replicability of data and the ability to provide complete and unadulterated data sets. Conventional security means can involve adding third party certificates to information in order to authenticate that information. However, the process of adding such certificates can involve input from external third parties winch can be time consuming. In addition, those external third parties and the certification process itself can be subject to their own security vulnerabilities and authentication needs.

SUMMARY

Systems and methods are described for associating a data value find its recording record as a unit or quantum of data and registering collections of those units within data quanta indexes and repositories. These systems and methods can atomize any type of data into as small of a recognizable quantum of data of that type as is possible that in a way that allows it to be recognized as reproducible data. Atomized data will be composed of both a value and a recording record describing how that value was generated during a particular recording event. Since no two data recording events associated with corresponding data quanta will be the same, the set of bytes associated with that data quantum file always will be unique. Each of these digital data quanta therefore can be stored and processed to generate a data quantum unique identifier. That identifier will individuate the data quantum in a way that facilitates indexing as well as detection of any alterations. Values in data quanta can be entered as part of the recording record of other values. Also data quanta can be organized into hyper-data quanta where value and recording-record entries also can be registered and identified as data quanta. Data quanta and hyper-data quanta registration files can be indexed so that the files that they reference can be searched for, retrieved and authenticated.

Data derived from data quanta and their registration files can be used to create data sets and data repositories with specific uses. For example, a repository of data quanta and a separate repository of data quanta registration files that include data quanta unique identifiers can be used to check the authenticity of data quanta before they are used to create data sets. Collections of registered and indexed data quanta represent a simple, low energy form of a database from which trusted data sets can be built on demand. These systems and methods can be useful in applications including, but not limited to, managing information derived from interpreting data, individuating or discretizing data, and mobilizing or using and re-using data efficiently and effectively.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a method comprising: providing a value file containing a value entry associated with a recording event, the value entry comprising value entry bytes; providing a recording record file containing a recording record entry associated with the value entry, the recording record entry also associated with the recording event, the recording record entry comprising recording record entry bytes; associating, at a computing device, in a data quantum file the value entry with the corresponding recording record entry, the data quantum file containing a data quantum comprising both the value entry bytes and the recording record entry bytes; generating, at the computing device, a data quantum unique identifier by applying an algorithm to the data quantum file such that any change to the value entry or the recording record entry produces a corresponding change to the data quantum unique identifier according to the algorithm; and associating, at the computing device, in a registration file the data quantum unique identifier and a data quantum file reference or locator; whereby the recording record provides information regarding the value entry in the context of the recording event, and the data quantum unique identifier allows for detecting alterations of any one of the value entry and the recording record entry.

The method can further comprise: storing the registration file in a repository located on a computer-readable memory in communication with the computing device; indexing the registration file, the indexing configured to make the registration file findable in a search of the repository; finding the registration file in the repository; generating, at the computing device, another data quantum unique identifier by applying the algorithm to the data quantum; and comparing, at the computing device, the other data quantum unique identifier with the data quantum unique identifier to determine if any one of the value entry and the recording record entry has been altered.

The method can further comprise: generating, at the computing device, a registration file unique identifier by applying a second algorithm to the registration file such that any change to the registration file produces a corresponding change to the registration file unique identifier according to the second algorithm; and associating, at the computing device, the registration file with the registration file unique identifier; whereby the registration file unique identifier allows for detecting alterations of the registration file.

The second algorithm can be the same as the algorithm.

The registration file can further comprise additional data, the additional data being different than the data quantum file locator and the data quantum unique identifier.

The generating can comprise: providing an empty buffer located on a computer-readable memory in communication with the computing device; writing to the buffer the value entry bytes and the recording record entry bytes; and applying the algorithm to the contents of the buffer to generate the data quantum unique identifier.

The method can further comprise: after the applying: opening a data quantum unique identifier file; storing the data quantum unique identifier in the data quantum unique identifier file; and wherein the associating in the registration file can comprise: opening the registration file; storing in the registration file the data quantum unique identifier file and one or more of: the data quantum file; and the data quantum file locator.

The method can further comprise: after the applying, modifying the data quantum file to designate the data quantum unique identifier as a descriptor of the data quantum file.

The descriptor can comprise one or more of: a name of the data quantum file; and an indexable attribute of the data quantum file.

The method can further comprise: providing a second value file containing a second value entry, the second value entry comprising second value entry bytes, the second value entry related to the value entry; and providing a second recording record file containing a second recording record entry associated with the second value entry, the second recording record entry comprising second recording record entry bytes, the second recording record entry describing the relationship between the value entry and the second value entry, the value entry being obtainable based on the second value entry and the second recording record entry.

The method can further comprise: providing one or more additional data quantum files each comprising a corresponding additional data quantum, each of the additional data quanta comprising: a corresponding additional recording record entry related to the recording record entry; and a corresponding additional value entry; wherein: the generating the data quantum unique identifier comprises applying the algorithm to the data quantum and the one or more additional data quanta such that any change to any one of the value entry, the recording record entry, the corresponding additional recording record entries, and the corresponding additional value entries produces a corresponding change to the data quantum unique identifier according to the algorithm; and the associating in the registration file comprises associating in the registration file the data quantum unique identifier with the data quantum file locator and the one or more additional data quantum file locators.

According to another aspect of the present specification there is provided a method comprising: populating a map data structure comprising keys and key entries with one or more value files each containing a corresponding value entry and one or more recording record files each containing a corresponding recording record entry associated with a corresponding value entry, the value entries and the recording record entries comprising value entry bytes and recording record entry bytes respectively, the one or more value files each stored as one of the keys and the one or more recording record files corresponding to each value file stored as a corresponding key entry, the map data structure located on a computer-readable memory in communication with a computing device; retrieving, at the computing device, a given key from the map data structure, the given key corresponding to a given value file; creating, at the computing device, a data quantum file name corresponding to a data quantum file; opening, at the computing device, the data quantum file; storing the given value file in the data quantum file located on the computer-readable memory; retrieving, at the computing device, a given key entry corresponding to the given key, the given key entry comprising a given recording record file corresponding to the given value file; storing the given recording record file in the data quantum file; generating, at the computing device, a data quantum unique identifier by applying an algorithm to the data quantum file such that any change to the given value entry or the given recording record entry produces a corresponding change to the data quantum unique identifier according to the algorithm; and storing, in a registration file located on the computer-readable memory, the data quantum unique identifier and a data quantum file locator associated with the data quantum file.

The method can further comprise, before the populating the map data structure: populating a list data structure with the one or more value files each containing the corresponding value entry and the one or more recording record files each containing the corresponding recording record entry, each entry in the list data structure comprising one of the one or more value files and its corresponding one or more of the one or more recording record files; and encoding all files in the list data structure to protect the value entries and the recording record entries from being corrupted during subsequent storage in and retrieval from the map data structure.

According to another aspect of the present specification, there is provided a system comprising: a processor; a memory in communication with the processor; a communication interface in communication with the process. The processor is configured to: receive a value file through the communication interface, the value file containing a value entry associated with a recording event, the value entry comprising value entry bytes; receive a recording record file through the communication interface, the recording record file containing a recording record entry associated with the value entry, the recording record entry also associated with the recording event, the recording record value comprising recording record entry bytes; associate in a data quantum file the value entry with the corresponding recording record entry, the data quantum file containing a data quantum comprising both the value entry bytes and the recording record entry bytes; generate a data quantum unique identifier by applying an algorithm to the data quantum such that any change to the value entry or the recording record entry produces a corresponding change to the data quantum unique identifier according to the algorithm; and associate in a registration file the data quantum unique identifier with a data quantum file locator; whereby the recording record provides information regarding the value entry in the context of the recording event, and the data quantum unique identifier allows for detecting alternation of any one of the value entry and the recording record entry.

The processor can be further configured to: store the registration file in repository located on the memory; index the registration file, the indexing configured to make the registration file findable in a search of the repository; find the registration file in the repository; generate another data quantum unique identifier by applying the algorithm to the data quantum; and compare the other data quantum unique identifier with the data quantum unique identifier to determine if any one of the value entry and the recording record entry has been altered.

The processor can be further configured to: generate a registration file unique identifier by applying a second algorithm to the registration file such that any change to the registration file produces a corresponding change to the registration file unique identifier according to the second algorithm; and associate the registration file with the registration file unique identifier; whereby the registration file unique identifier allows for detecting alternations of the registration file.

The memory can further comprise a buffer; and the generating can comprise the processor being configured to: clear the buffer; write to the buffer the value entry bytes and the recording record entry bytes; and apply the algorithm to the contents of the buffer to generate the data quantum unique identifier.

The system can further comprise: after the applying, the processor being configured to modify the data quantum file to designate the data quantum identifier as a descriptor of the data quantum file.

The processor can be further configured to: receive through the communication interface a second value file containing a second value entry, the second value entry comprising second value entry bytes, the second value entry related to the value entry; and receive through the communication interface a second recording record file containing a second recording record entry associated with the second value entry, the second recording record value comprising second recording record entry bytes, the second recording record entry describing the relationship between the value entry and the second value entry, the value entry being obtainable based on the second value entry and the second recording record entry.

The processor can be further configured to: receive through the communication interface one or more additional data quantum files each comprising a corresponding additional data quantum, each of the additional data quanta comprising a corresponding additional recording record entry related to the recording record entry and a corresponding additional value entry; wherein: the processor being configured to generate the data quantum unique identifier can comprise the processor applying the algorithm to the data quantum and the one or more additional data quanta such that any change to any one of the value entry, the recording record entry, the corresponding additional recording record entries, and the corresponding additional value entries produces a corresponding change to the data quantum unique identifier according to the algorithm; and the processor being configured to associate in the registration file can comprise the processor associating in the registration file the data quantum unique identifier with the data quantum file locator and one or more additional data quantum file locators each corresponding to one of the one or more additional data quantum files.

According to another aspect of the present specification there is provided a computer-readable medium comprising computer-executable instructions configured to direct a processor to: receive a value file through the communication interface, the value file containing a value entry associated with a recording event, the value entry comprising value entry bytes; receive a recording record file through the communication interface, the recording record file containing a recording record entry associated with the value entry, the recording record entry also associated with the recording event, the recording record value comprising recording record entry bytes; associate in a data quantum file the value entry with the corresponding recording record entry, the data quantum file containing a data quantum comprising both the value entry bytes and the recording record entry bytes; generate a data quantum unique identifier by applying an algorithm to the data quantum file such that any change to the value entry or the recording record entry produces a corresponding change to the data quantum unique identifier according to the algorithm; and associate in a registration file the data quantum unique identifier with a data quantum file locator; whereby the recording record provides information regarding the value entry in the context of the recording event, and the data quantum unique identifier allows for detecting alternation of any one of the value entry and the recording record entry.

BRIEF DESCRIPTION OF THE DRAWINGS

Preferred implementations of the present specification will now be described, by way of example only, with reference to the attached Figures, wherein:

FIG. 1 shows schematically elements of a data atomization approach, according to non-limiting implementations.

FIG. 4 shows schematically two programmatic methods of data quanta creation, according to non-limiting implementations.

FIG. 7 shows schematically programmatic creation of data quanta registration files, according to non-limiting implementations.

FIG. 11 shows schematically a data centric ato-publication products, according to non-limiting implementations.

Figure 2:
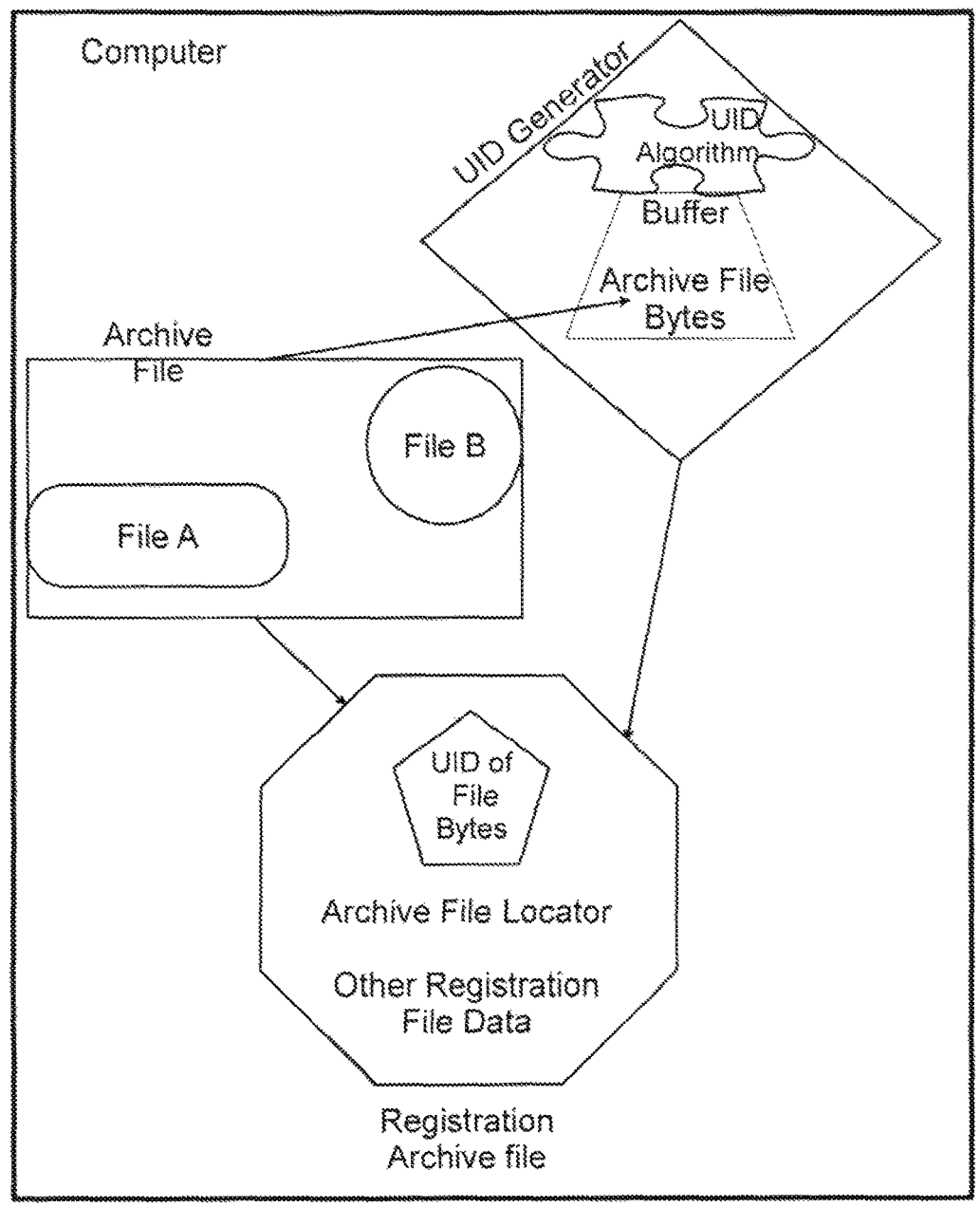
FIG. 2 shows schematically a general method for uniquely identifying archive files, according to non-limiting implementations.

DETAILED DESCRIPTION 1.0 Introduction
1.1 Background

BioTIFF is a modified version of the multi-page tagged image file (.tif) format for organizing digital data. BioTIFF can serve as a storage, archive and transport container for image-based data. Storage of data in a BioTIFF page can ensures that specific meta-data needed to give meaning to specific primary image data always is available when that primary data is examined.

The BioTIFF file format individuates data by ensuring that all discrete elements of meta-data necessary to describe the instantiation of a discrete set of primary data values are both available within the same file page as that primary data. As a result of that pairing, discrete primary data and meta-data can be recognized by a computer. This is accomplished by identifying and registering the unique set of bytes that represent all of the data on that file page. Those unique bytes can be identified algorithmically. Calculating the unique identifier of those bytes and associating it with the file page can make that page self-authenticating. One reason that a capacity for self-authentication is useful relates to the fact that the capacity allows for detection of any unintended or unauthorized modification and/or alternations of the data on that page. That capacity can make the data on that page more trustworthy.

If even a single byte of that data had been changed by inserting and retrieving the bytes from the BioTIFF container, that change would be detectable. The observation that the retrieved bytes can function in the same way as the inserted bytes, e.g. as an executable computer code, provides a test for demonstrating the integrity and functionality of those bytes. Each BioTIFF entry can also be uniquely identified. In that example the data is computer code. However, that test suggested that any meaningful set of uniquely identified bytes can be recognized as part of a larger meaningful set of uniquely identified bytes. That observation is developed in greater detail in this specification.

This specification seeks to demonstrate how to individuate any type of value/recording record pair associated with a particular recording event into a unique set of bytes that can be identified, registered, archived and retrieved for later use. The data atomization process described here has some similarities to data wrapping processes that individuate discrete sets of bytes of data that can be interpreted by a computer as values resulting from a particular data generation or transformation event that was deemed significant enough for the data values resulting from that event to be recorded. By linking each value with a recording record, the validity and reproducibility of that value can be assessed whenever it is examined, as is required for that value to be used as data.

1.2 Data Atomization into Individuated Data Quanta

The specification starts by offering a definition of the most individuated form of any type of data concerning a value of any type that results from application of a particular method. That fundamental unit of atomized data can be termed a data quantum, and more than one of these can be termed data quanta. A data quantum can comprise a set of one or more values that can be recognized, as having a coherent meaning by being explicitly linked to an explicit recording record. That recording record is a digital file containing a set of entries describing a specific recording event were the contents of the value file were determined. In some implementations, minimally that recording-record will communicate how the recording of the value(s) was accomplished; how that recording can be reproduced, how the data quantum was generated; and optionally the significance and purpose of recording the data quantum. The present specification describes the atomizing and individuating a value/recording record pair as this fundamental unit called a data quantum.

The generation of data quanta collections represents a previously unrecognized process of systemic data atomization. In an analogy to physical atoms, the materialized data quantum will have an elemental nature determined by the type of value recorded and the nature of the recording record. Also like an individual atom each data quantum will be unique because no two data quanta can be associated with precisely the same recording record. This data atomization process also can be useful in synthesizing new data from existing data.

This process is also biologically inspired. The bytes within a data quantum can be considered analogous to viral genetic material that allows the virus to replicate itself within a host cell. Atomization is essentially a means of packaging the data material in a discrete viral capsid-like shell for protection, dispersal and targeting.

The noun data often is used in an uncountable sense. However, individuating data into pairings of related value/recording record entries makes data countable. This is particularly important for empirical values representing the results of particular empirical recording events where some uncertainty exists concerning why the value record has a particular magnitude or quality attribute associated with it is what it is. The definition of a data quantum highlights a premise of this specification: a given recorded value can only be interpreted as a data value if it can be associated with a recording record. Therefore, neither values alone nor recording records alone can be considered data. It is only when they are considered together that they can serve the function of data and be considered data. Without that association they are not-data.

Distinguishing between whether a value is used as primary data or secondary data or meta-data can be problematic if there is no indication of how or why that data value was generated and determined through specifiable evaluation and recording methods. For example, a particular temperature evaluation made using a particular thermometer can be used as meta-data to describe the environmental temperature during a recording event. That same evaluation can be used as primary data within the context of evaluating the reliability of the thermometer used in that experiment. The evaluation can be transformed into secondary data if it is converted from the original reading in degrees Centigrade to a Fahrenheit scale reading. The value may be part of a fuzzy set of data that is defined semantically using a membership function describing the concept of hot qualitatively but also in a form that can be processed by a computer. The recorded data value may not even be a quantitative evaluation, it might be a qualitative description. For example, it could be a hermeneutic or interpretive data value comprised of, for example, an audio-video recording of someone describing what evaluating the thermometer reading means to them. Enabling data quanta to be recorded when meaningful values are associated with evaluating the thermometer reading will be useful in registering data generated with the aid of that thermometer regardless of whether the data was instrumental, deterministic, fuzzy or hermeneutic, or any other type of data.

This specification teaches how to wrap data in virtual data protective packaging that protects the data from unintended alteration while also allowing data to be individuated through unique identification and registration of elemental data quanta. By analogy with the term hyper-text markup language, we use the term hyper-data quanta to refer to application of the method and system in a way that allows links across these different levels of individuation to be described within value and recording record entries that themselves can be data quanta. Conversely, sets of data that need to be considered as a whole for deriving meaning, for a particular purpose, can be described as being made up of blocks of data quanta and hyper-data quanta.

For example, consider the case of where values of various types, derived from those temperature reading events, and occurring over time and under different contexts, are stored within a spreadsheet. Entry of a value into a cell of that spreadsheet is an attempt to individuate that value. That spreadsheet cell indicates the intersection of a column representing for example, a type of value and the row representing for example, one set of circumstances where the type of value was instantiated. The recording record for the value entered in that cell can be re-constructed to a certain extent from interpreting the meaning of attributes registered and being associated with that row and that column. This may require reference to files and information stored outside of the spreadsheet file, possibly on another computer. The entire spreadsheet associated with readings made with a given thermometer over time and different contexts can be individuated by assigning a name to the spreadsheet file and linking it to a method by which it was generated. This will differentiate that spreadsheet from other such spreadsheets (e.g. spreadsheets representing the names of different spreadsheets associated with temperature evaluations made using different thermometers).

These examples illustrate how generally, data, and the value/recording record pairs that it is composed of, can be individuated and that there can be different levels of data individuation. This specification teaches how each of those levels of data individuation can be represented as blocks or sets of data quanta associated with different levels of meaning and integration. The methods and systems described herein can allow individuation and registration of different data quanta and hyper-data quanta and different sets or blocks of data representing different types and levels of individuation. For example, it can allow either spreadsheets of values or spreadsheets of spreadsheets of values, to be generated on demand from collections of data quanta stored in a repository or from a repository of indexed data quanta registration files that help locate relevant sources of spreadsheet values. One non-limiting platform for establishing such repositories is a multi-page BioTIFF file.

1.3 General Description of the Methods and Systems

The methods and systems described herein are applicable to all forms of data where the bits and pieces of digital data are recorded or aggregated under a set of circumstances or specifications that characterize the context of recording value entries whose production can be described as a set of recording record entries. This will be true however people and groups individuated that data conceptually. All that is required is that the digitally recorded data also is individuated at a fundamental recording event level that a computer can be programmed to recognize. One way of doing so is to have recording records and values stored separately with the assumption that they can be considered together if needed. This application describes another way of recognizing values as data values through access to a recording record. As described in this application, the process of creating data quanta recordings always will involve uniquely identifying a set of bytes associated with a specific file containing value and a recording record entries concerning a given data recording event, sufficient to qualify the value(s) in that file as data.

In its simplest form of a value file entry can be a single byte, for example representing the number 7, and the recording-record file could contain a single byte, for example representing the letter D. That association could allow someone trained in the art to assign meaning to the association by understanding that instrumental value 7 was generated using method D which could be understood as always involving a particular instrument used in a particular way such that it generated values of a particular type on a particular scale where the value 7 means something to that person. If this data quantum was created using a tar archive on a Unix type operating system, that tar file would be 10,240 bytes in size; the archiving technology occupies 10236 of the archive file's size. In calculating the data quanta unique identifier all of the bytes are used, including those bytes contributed by the archiving technology, to individuate the data quanta. The largest usable single data quantum will be limited by the physical computational and storage resources available. It can be many gigabytes or even much larger.

1.4 Applications of Data Atomization

This data atomization process can be useful because throughout human existence the ability of people and groups to empirically associate verifiable data with certain specifiable events has allowed them to make informed choices useful in surviving and prospering. A large amount of time, energy and money is expended by people and groups in carrying out and storing the results of specific recording events, that use specified methodologies, to gather data for guiding and justifying future actions. A trusted and organized representation of the results of those data measurement events can have many applications in: research, quality control, billing, regulation, governance, management, and so on.

In some cases data collected for record keeping purposes can be used for other ancillary purposes such as evaluating the consistency or relative quality of comparable events. In other cases, recording events may not be precisely repeatable because of the unique set of circumstances involved. However, creating a data quantum will make evident methodological details of the event such that those people trained in the art can judge for themselves the quality of the recording event. For example, when a deposition is recorded using a particular method to register a particular person's impression of a particular event that they witnessed, enough information is to be found in that deposition to allow examiners of the deposition to be convinced of its claims without having to interview that person directly. This can be useful for example, if that person has died. The data contained in that deposition, can reasonably be accepted as functionally equivalent to similar data obtained from direct statements made by the person in a court-room. Hence, the data quanta format described here can be applied to individuating both instrumental data and data that is collected to support inductive or hermeneutic interpretations.

There are many ways of conceiving the formulation of a non-trivial recording record that can be accommodated by the present specification. Ideally, that recording record will inform how the process leading to recording of the values in the data quanta was executed as well as providing data that can be formatted into information concerning, but not limited to: why the recording event was initiated, who and what was involved, and where and when it happened.

Since no two recording episodes will be associated with exactly the same set of one or more of how, why, who, what, where, or when information, the bytes representing the value and recording record files, associated within a data quantum for any given recording event will be unique and uniquely identifiable. For example, the data quantum file will contain a unique set of bytes such that when a hashing algorithm is applied to that set of bytes the same alpha-numeric hash string identifier will always be generated.

In general, the data atomization process described above can allow for versatility in managing data records. It accommodates all forms of data quanta regardless of, for example: how many values are recorded; what format was used in their recording; what reason was behind their recording, and so on. The value part of a data quantum can range from a single digit to an extremely large set of values. Those values can represent a direct observation, or an analytical or an instrumental transformation of a direct observation, or even a verbal opinion or an artistic interpretation recorded from an identified individual or group in a particular context.

In general, recording records can be formulated in a wide range of ways and contain a number of entries. For example, recording record entries can include but are not limited to: the logic model governing the test protocol that was deemed appropriate for generating the values, what equipment was used, what were the settings on the equipment, what were the climatic conditions at the time, who performed the operation, and so on.

In general, each of those entries themselves sometimes can be represented in the form of subsidiary data quanta. A recording record may indeed contain previously captured data quanta. Indeed, file pages like the page of a BioTIFF file can be structured so as to be recognized as being made up of blocks or sets of individual data quanta.

In general, the described methods and systems facilitate registration of data quanta so that they can be found and re-used at a later time and, if desired, combined with other data quanta into hyper-data quanta or transformed into new data quanta. For example, a registration file can be generated that contains minimally the unique identifier for that data quantum and a reference to the data quantum formulated in a way that allows that data quantum file to be located and interrogated. For example, it could be a web address like a URL, or it could be a file name pointing to a file stored on the computer. Creation of a repository of such registration files can make it possible to compare the unique identifier calculated from the located data quantum to the registered unique identifier so that any alteration of the data quantum between that time and the time the data quantum was registered can be detected. According to some implementations of the system and methods, a registration protocol can be specified where other identifying data is included in the registration files.

That registration file can be processed using index technology, like a Lucene indexing engine, to create a searchable index that also can serve as a data repository or can allow identified data sets to be created on demand. The correspondence of that information with equivalent information associated with the identified and accessed data quanta will allow an observer to determine to their own level of satisfaction that, for example, the data quanta have remained unchanged between the time of their observation and the time of its registration as a data quantum.

Creation of data quanta individuates pieces of data into a meaningful and identifiable objects and builds a level of trust in the integrity of that data. By being coherent and explicit, a data quantum can warrant to people trained in-the-art that it is what it purports to be, in terms of its contents as well as its purpose and significance, whenever and wherever that data quantum is stored, registered, indexed, searched for, accessed or interrogated.

2. Description of Some Non-Limiting Implementations

FIG. 1 describes the types of files referred to in this specification. Data recording events can be associated with specific output value entries and recording record entries. The value 11 and recording record 22 can be associated in a data quantum 33 for recording event 20. This data is in the form of a digital file, and can be represented by bytes recorded on a computer readable memory.

The specification describes relationships between a set of specified digital files. These files wrap or package the data in a way that can protect it from adulteration and degradation and can provide a way of verifying that the contents that have are the same as they were when the data quantum was registered, i.e. that the contents have not been altered.

FIG. 1 also describes how digital files are structured within the methods and systems to associate and contain: value entries; recording record entries; the two together within a data quantum file; and a data quantum unique identifier of all of the bytes associated with a given data quantum file. FIG. 1 also shows registration data including: a registration file unique identifier that can be generated using all of the bytes in the registration file, which can include a reference to the data quantum file (i.e. a data quantum file locator), the data quantum unique identifier, and optionally other information useful in registering that data quantum. The generation of the registration file unique identifier can also be based on the bytes in the data quantum file. FIG. 1 also shows one or more data quanta that themselves serve as value and recording record entries within a hyper-data quanta file; and finally, blocks of data quanta and hyper data quanta that can be chained together in a distributed registry as references to multiple data quanta and hyper-data quanta stored within other repositories including, but not limited to, a multi-page file such as a TIFF file, a BioTIFF file, and the like.

Using a computer to associate the value and the recording record can be enabled by, but is not limited to, archiving technology that allows several files to be appended together in for example an archive file or a tar file. FIG. 2 illustrates how in general two files can be associated in an archive file. A specific archive file containing multiple appended files can be uniquely identified using a hashing algorithm such as, but not limited to, the MD5 Message Digest Algorithm. There are two non-limiting methods for associating that unique identifier with the file it identifies. The simplest way is simply to open another archive file to serve as a registration file to which is appended a file containing the unique identifier (UID) and a reference to the identified file that allows that file to be located and the UID to be re-calculated. That method is illustrated in FIG. 2.

Figure 3:
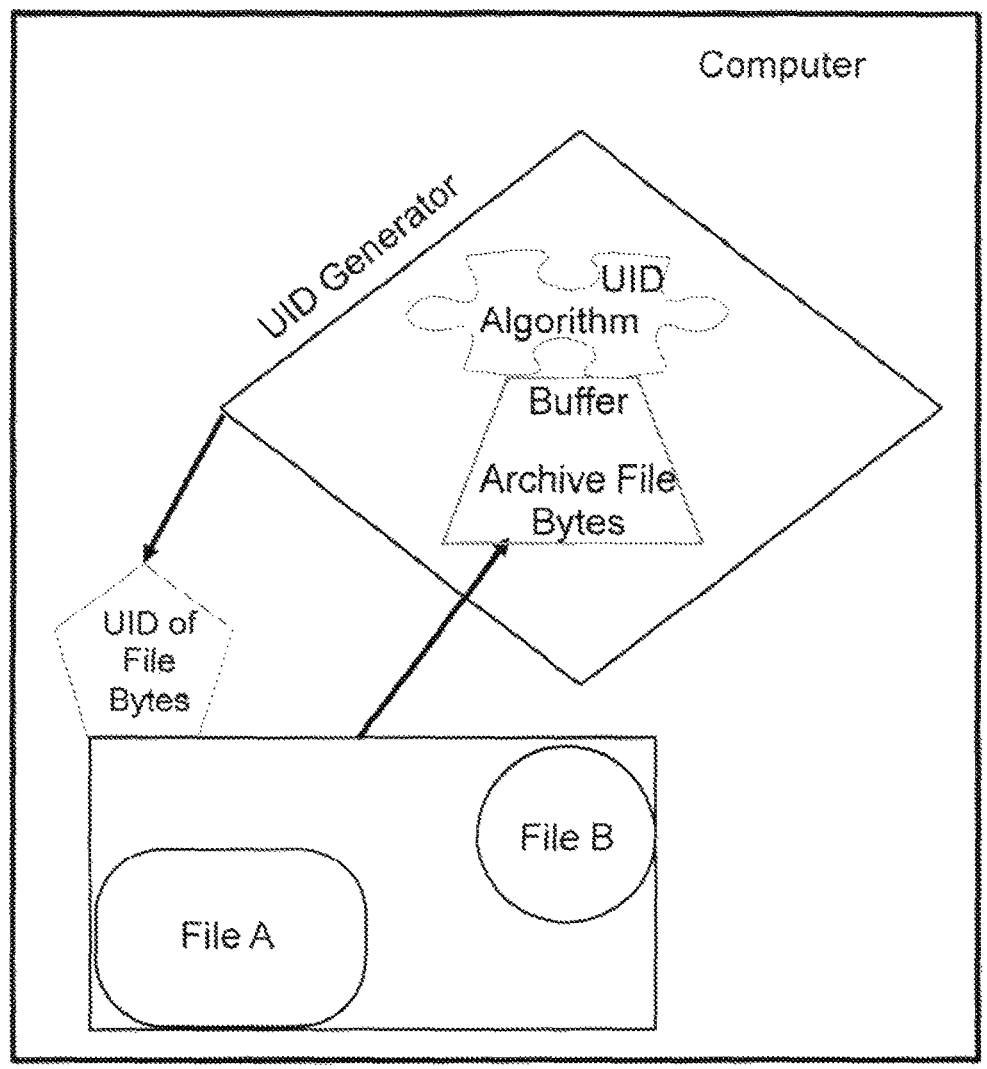
FIG. 3 shows schematically a special descriptor method for uniquely identifying archive files, according to non-limiting implementations.

Another method of associating a UID with the identified file depends on the underlying archiving technology and is described in FIG. 3. Within the context of that specification, the UID becomes a highly specialized descriptor of the archive file. These are two of many non-limiting methods of associating a UID with an identified file using archiving files.

FIG. 4 provides a programmatic description of those two methods. This description demonstrates the general feasibility that will be recognized by those trained in Ute art that files can be uniquely identified. This application demonstrates how that procedure can be applied in a systematic manner to quantize, individuate, and/or atomize data.

Figure 5:
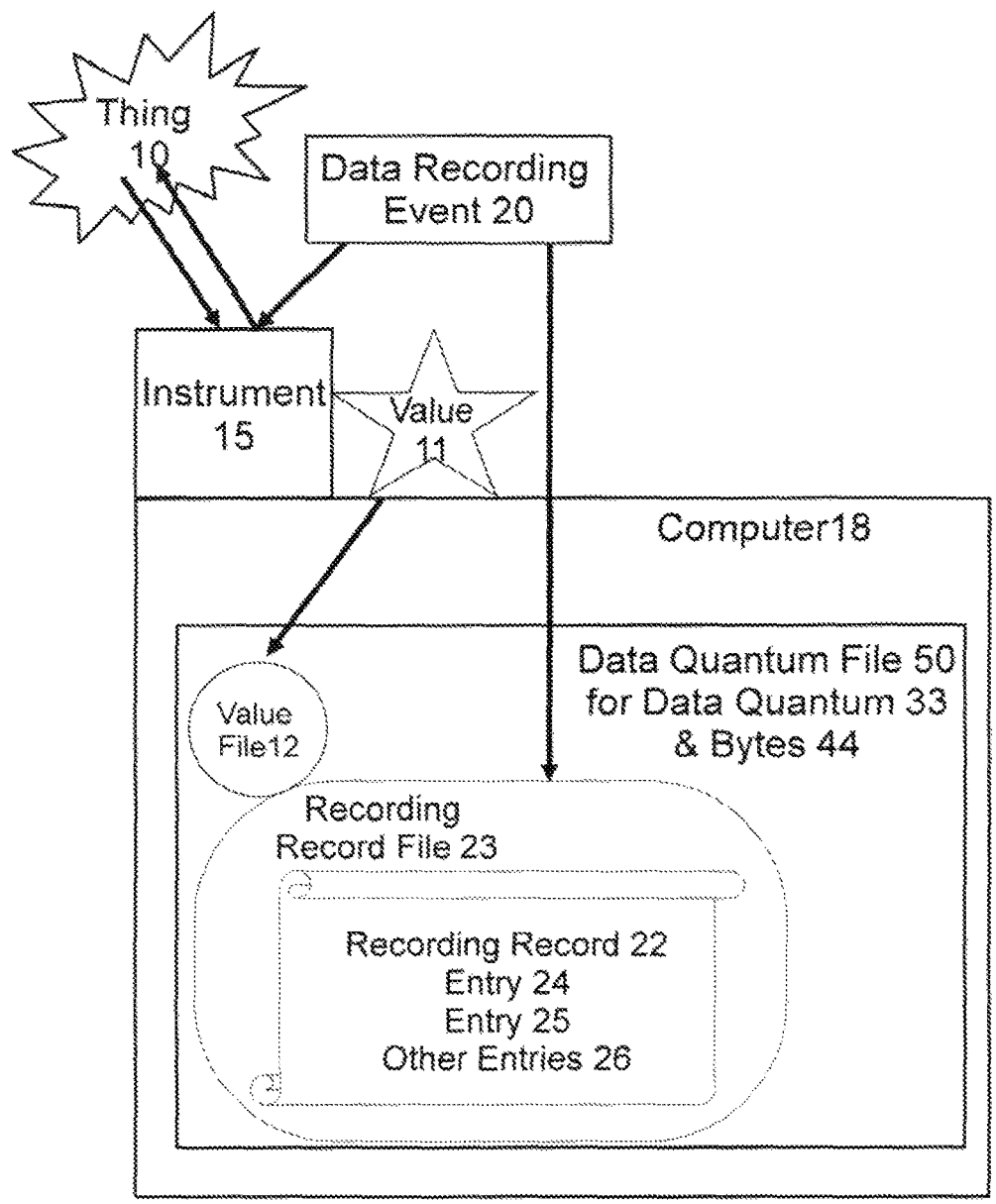
FIG. 5 shows schematically the creation of data quanta during a specific recording event, according to non-limiting implementations.

FIG. 5 shows an exemplary way of recording and creating data quanta. An empirical value (11) can be recorded in a digital value file (12) as a representation of the result of an observation or an experiment concerning a certain thing (10). Recording of the value 11 can be mediated by programmed, microprocessor controlled steps that can be explicitly described: for example an instrument (15) controlled by a computer (18) to examine a particular tiling (10). This digital recording regime can capture value 11 together with an explicit recording record 22 of the steps taken to instantiate value 11.

The recording record file (23) can contain sufficient and necessary data entries to make up an explicit recording record of the steps taken to instantiate the value file 12. That recording record 22 also will enable a person trained in-the-art to reproduce, or at least evaluate the steps taken to produce the value(s) 11 recorded at that specified event. It also can allow such a person, examining the data quantum 33 at a later time, to understand what assumptions where made about conditions associated with instantiation of the data quantum 33.

For example, a recording record 22 can include but is not limited to: the logic model governing the test protocol that was deemed appropriate, what equipment was used, what were the settings on the equipment, what were the climatic conditions at the time, who performed the operation etc.

As shown in FIG. 5, entries of information into the recording record can come in multiple formats. These entries can include but are not limited to: i) a file or set of files (24), such as a spreadsheet, a relational database, or the like, containing settings of the instrument (15) used to explore thing (10) to generate value (11); ii) a complete audiovisual record (25) of the performance of the event that led to the value (11) that is the subject of the recording record (22); and other entries (26). In some implementations, one of those other entries 26 can be a text file that can allow readers to recapitulate how the recording episode and the recording record 22 was structured and how it was designed to represent the recording episode, within an empirical framework.

Having access to both the value (11) and its recording record (22) from the value file (12) and recording record file (23) in the data quantum is useful because this access allows, for example, third party agents to assess the meaningful repeatability and reproducibility of the value and possibly how the method might be adapted for some other purpose. Consider, for example, a value represented by the number 7. By itself, that value could represent: a ratio, a temperature, a person's age, a nominal value, in certain units, associated with a unique event. As part of this description, it is to be understood that any value, and especially an empirical value, can only be considered data when associated with a recording record of how that value was generated. Otherwise, the examiner of that value may not be able to determine what the value referred to or how to repeat the event that led to recording of the value in the first place.

A data quantum can be specified such that those trained in the art can: i) judge the likelihood that each step in the process is within known boundaries of relevance, reasonableness, and reliability for producing accurate measures and ii) critically assure themselves that it is possible to reproduce the process and attempt to acquire analogous values. In some implementations completion of both step i) and step ii) can be necessary and usually sufficient for usefully converting the value(s) into data while at the same time making the data quanta uniquely identifiable. A data quantum can be one where the recording record is designed to support steps i) and ii). Although there may be disagreement amongst those trained in the art regarding what is necessary and sufficient recording record, that recording record specifies what was assumed to be so (i.e. necessary and sufficient) during that event.

The data quantum can be stored in a digital file (50) where it can be represented as a series of bytes (44) that can be accessed so as to make the data quantum information readable by a computer and communicable. This specification describes how writing the bytes representing the value 11 and the recording record 22 to their own data quantum file (50) can be useful. Since a unit recording event occurs at a particular location, starts and stops at particular times and is carried out in a specific way dependent on circumstances and context, each recording event 20 leading to the production of a recorded value 11 will be different in its particulars. As a result, the set of bytes (44) in a particular data quantum file (50) and identifiable as representing the value (11) and recording record (22), will be different. This enables application of an algorithmic unique identifier generator (61) (shown in FIG. 9) to those bytes (44) to generate an alpha-numeric string called a data quanta unique identifier (DQ-UID) 62 (shown in FIG. 6) using an algorithm including, but not limited to, the MD5 Message-Digest Algorithm.

Figure 6:
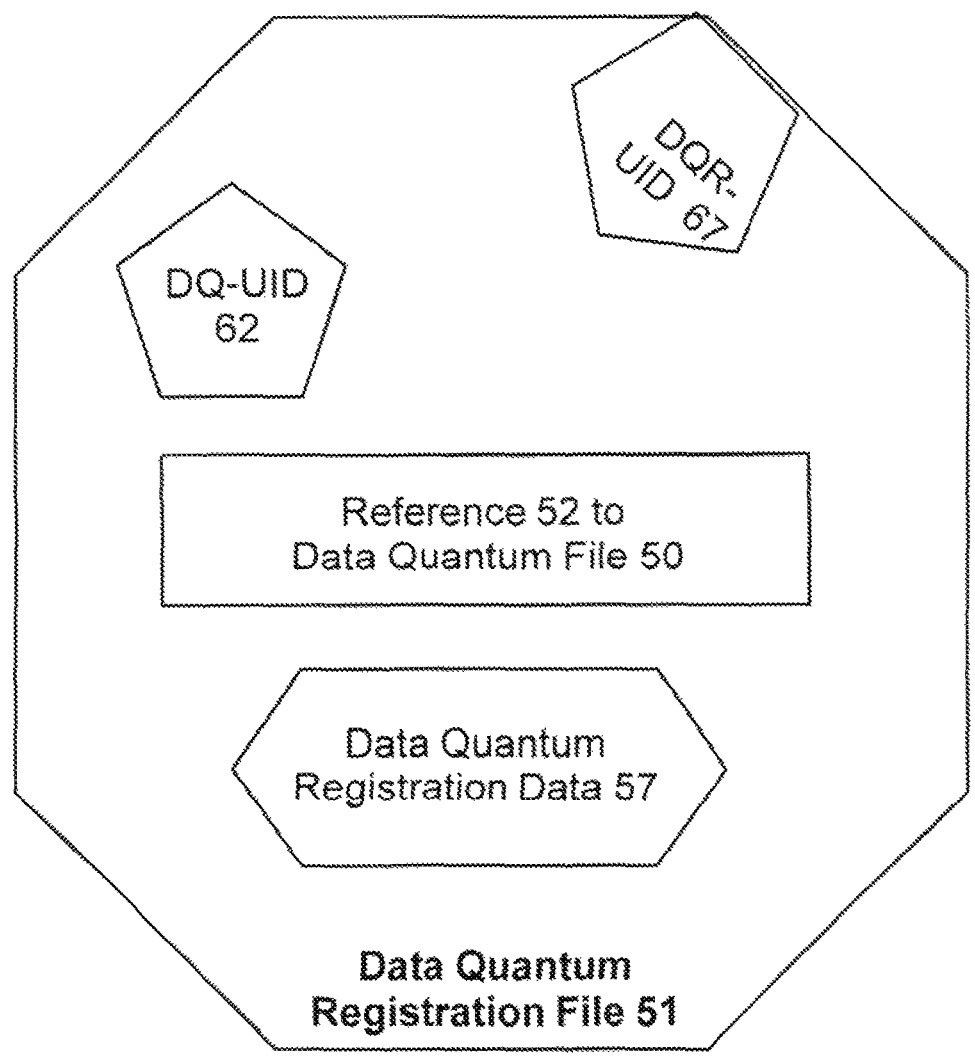
FIG. 6 shows schematically elements of a data quanta registration file, according to non-limiting implementations.

Referring now to FIG. 6, to register that act of identifying a data quantum file (50) using a DQ-UID (62), that identifier can be associated with the registration file or DQR (51). In some implementations, the registration file can minimally contain a reference (52) to the data quantum from which the associated DQ-UID 62 was calculated. In other implementations, the registration file can include the data quantum file instead of and/or in addition to the reference to the data quantum file (also referred to as the data quantum file locator). Optionally, other registration data (57) also will be included in the registration file to assist in indexing operations. For example, the other registration data can include: the type of algorithm used to generate the unique identifier; a standards protocol that specifies what type of information should be recorded and how; the registration authority overseeing the registration process; and so on.

All data associated together in that registration file can be represented by a unique set of bytes that also can be uniquely identified using a given algorithm to generate a registration file unique identifier (DQR-UID) (67) that can be associated with Ute data quantum registration file (51). The creation of a registration file can allow data quanta to be indexed, using for example the Lucene indexing engine, such that repositories of data quanta and data quanta registration files can be created.

While the above description refers to unique identifiers in relation to data quanta and registration files, it is contemplated that these identifiers may not be mathematically unique. In other words, using a given algorithm to generate these identifiers, it may be highly improbable, but not impossible, that two different inputs into the algorithm would produce the same identifier output. Depending upon which cryptographic hash function is used the probability of two different inputs generating the same "unique" identifier is practically zero. Examples of very collision resistant hash functions include SHA512 and WHIRLPOOL.

FIG. 7 depicts steps of an exemplary method according to an implementation of the present specification. The first step involves populating a list data structure with the name of value file and recording record files. Each entry in this list specifies a value file and accompanying recording record file(s). The next step comprises iterating over the list populated in step 1 above. While iterating over the list, all file names can be encoded in order to protect special characters. The encoding can comprise using UTF-8 to encode special characters found in the file names. The next step comprises populating a map data structure using the value file as the key and the recording record files as the accompanying value entry. Once the map is populated, the method can iterate over the populated map structure. The next step can comprise getting the key value from the map which is the value file name. Given the value file name, the next step can be to create a data quantum file name from that value file name. Once the the data quantum file name has been obtained, the next step can comprise opening the data quantum file. The next step can comprise adding the value file to the data quantum file. The next step can comprise obtaining the accompanying recording record files from the map. Once this set of recording record files have been obtained, the method can iterate over them. At the next step, each of the recording record files can be inserted into the data quantum file. Next, the data quantum file can be closed. Next the data quantum unique identifier-(DQ-UID) can be calculated by applying a given algorithm, to the data quantum file bytes. Next the data quantum unique identifier and the data quantum file name can be written to the dedicated registration file-(DQR). Once indexed, collections of data quanta can be stored in a data quanta repository (53) (shown in FIG. 8) at the same time or at a later time. In addition, collections of data quantum registration files can be created. Hence individuating and registering data quanta can enable the creation of a distributed ledger of data quanta and represents a simple database that can be more easily maintained than so-called relational data bases such as an Oracle database. It should be noted that, the byte streams delivered to or from repositories can be delivered via a network connection or read from directly attached storage media. Since the bytes representing a given data quantum stored in a data quantum file can be considered the smallest unit of data still recognized as data as defined in this specification, and can be demonstrated to be different from any other unit of data, this way of recording data can be considered a data atomization process. The data quanta can be stored in the archive in a way that those bytes will always generate the same DQ-UID. This can be true however and whenever the DQ-UID is calculated.

Figure 8:
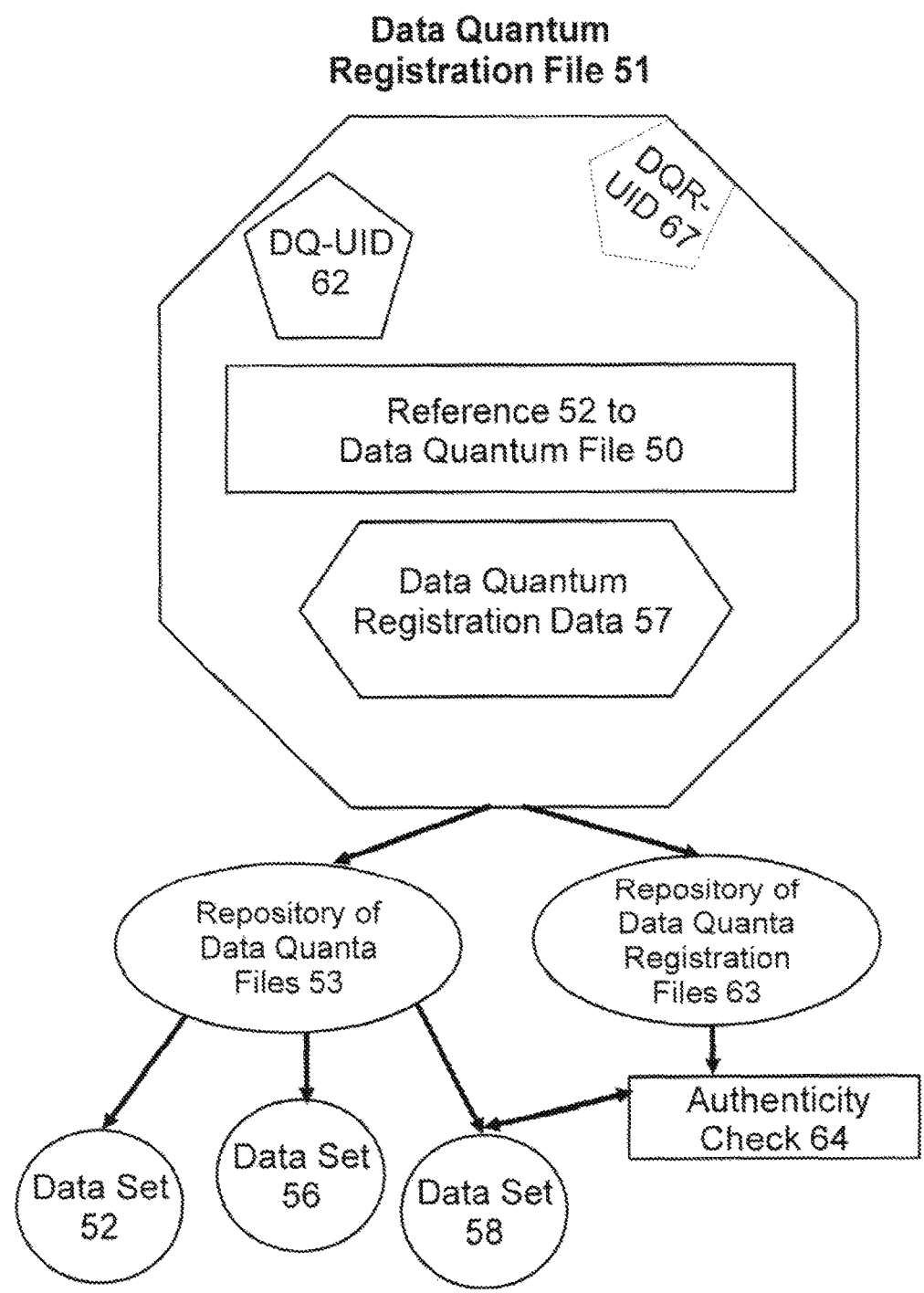
FIG. 8 shows schematically a method for using repositories of data quanta files and data quanta registration files for an authentication check, according to non-limiting implementations.

FIG. 8 illustrates how a data quantum file submitted to a data quanta repository (53) can be used to generate new data sets (54, 56, 58) on demand in a way that the data retrieved to be associated within the data set can pass an authenticity check (64) comparing the UID of the data quantum from which it is retrieved from to the UID registered in the registration file repository 63 that directed the retrieval of that data.

Figure 9:
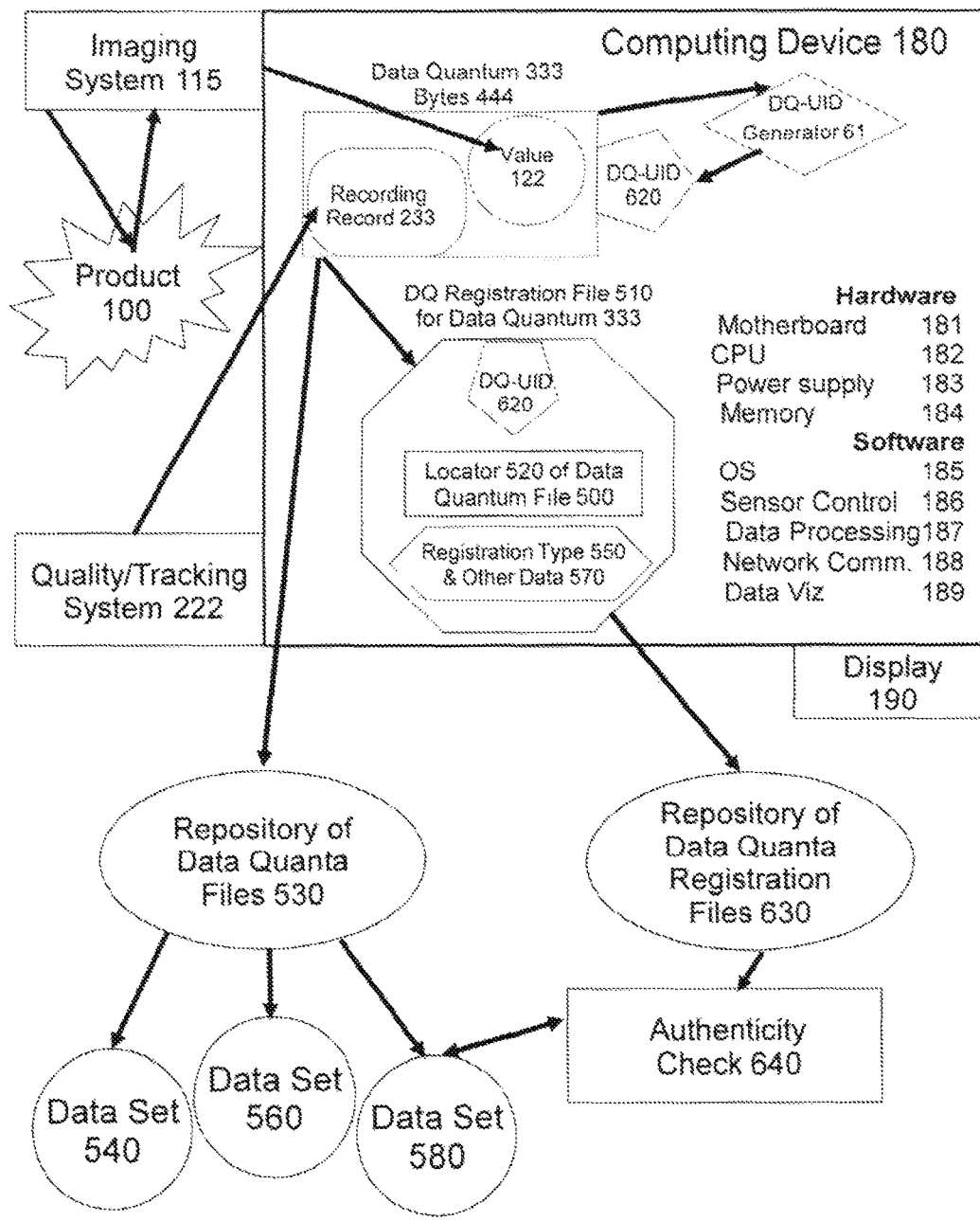
FIG. 9 shows schematically a system for using repositories of data quanta files and data quanta registration file for an authentication check, according to non-limiting implementations.

FIG. 9 shows an example system that implements such an authenticity check. In that system a digital sensing instrument such as, but not limited to, an imaging system (115) comprising at least a computer controlled camera and an illumination system connected to computing device (180). Computing device 180 can comprise a mother board (181), with a central processing unit (CPU) (182), a power supply (183), one or more displays (190) for viewing for example, webpage windows and/or data visualizations, and computer memory (184), said memory containing software including but not limited to an operating system (OS) (185), and one or more of an imaging system control software (186), data processing software (186), network communication software (187), data visualization software (188), webpage serving software (189).

The imaging system (115) can be used to probe a product (100) as part of a product quality/tracking methodology (200), said method can be implemented for example, by a licensed provider in order to meet license requirement. A quality/tracking system event involves recording the results of a product evaluation event using the imaging system (115) at a particular time in the product's lifecycle for a particular purpose such as quality control and/or product tracking. These particulars are registered in a recording record (233) for that event.

A value file (122) is assigned to that recording record file based on the subject and purpose of that event. A digital registration file (510), such as a ZIP file or a tar file, can be created on the computing device controlling the sensor, or at another computing device accessible via a network, and can receive the value file (122) and the recording record file (233) to create a data quantum file (500) that can be associated within a registration file, also referred to as a data quantum registration file (510).

That data quantum registration file (510) is represented as a set of bytes (555) that can then be converted using an algorithmic UID generator (61) such as, but not limited to, the MD5 Message-Digest Algorithm, into a set of characters that can serve as a unique identifier (DQ-UID) (620) for that particular data quantum. This DQ-UID (620) can be registered in a data quanta repository (530), on that computing device and/or at another computing device connected via a network (not shown in FIG. 9). This DQ-UID (620) also can be registered in a data quanta registration file (510), on that computing device and/or at another computing device connected via a network and entered into a registration file repository. Hence, provided the data storage process is not corrupted at some later time, comparison of DQ-UID (620) can be used to authenticate data quanta information being added to a Data Set (580) at a later time. This can be done using the Authenticity Check system (640). In general Data Sets of all types (e.g. 540, 560, 580, etc.) can be generated on demand from a data quanta repository (530).

According to an implementation of the present specification, there is provided a method for atomizing and individuating data. At a first step, a value file can be provided. The value file can contain a value entry associated with a recording event. The value entry can comprise value entry bytes. For example, an instrument such as a digital camera can record a thing, such as a flower, during a recording event, such as taking a digital photograph. The value entry in such an example can comprise bytes forming the digital image of the flower. The value entry can be stored in a value file.

At the next step, a recording record file can be provided. The recording record file can contain a recording record entry associated with the value entry. The recording record entry can also be associated with the recording event. The recording record entry can comprise recording record entry bytes. For example, the recording record can comprise one or more recording record entries which can comprise a digital record of the camera settings, time, place, etc. associated with the recording event of capturing the digital photograph. As such, the recording record is associated with the recording event; for example, taking the digital photograph. The recording record is also associated with the value entry (e.g. the bytes of the digital photograph) in that the recording record provides information regarding the value entry in the context of the recording event (e.g. the conditions/parameters associated with the capturing of the digital image). Recording record entries can comprise bytes and can be stored in a digital recording record file.

The value file and the recording record file can be captured through a measurement instrument and then communicated to a computing device, and subsequently saved on a memory of the computing device. Alternatively and/or in addition, the value and recording record files can exist as saved files on one or more external computer-readable memories in communication with the computing device.

At the next step, at the computing device the value entry and its corresponding recording record entry (or entries) can be associated in a data quantum file. The data quantum file can contain a data quantum comprising both the value entry bytes and the recording record entry bytes. As such, the data quantum file can comprise a digital file containing both the value entry bytes and the recording record bytes. The associating can comprise, but is not limited to, including and/or saving both the value entry and its corresponding recording record entry (or entries) in a common file. This common file can be the data quantum file. Using the digital photography example, the data quantum file would contain the bytes of the digital image and also the digital bytes reflecting the camera settings, time, place, etc. corresponding to the capturing of that digital image.

The associated combination of the value entry and its corresponding recording record can be termed a data quantum because the recording record provides information such as context, conditions, and/or other interpretive aids to the specific value entry. When associated in the data quantum, the value entry can be understood and interpreted in light of its corresponding recording record and as the result of a discretely individuated recording event.

At the next step, at the computing device a data quantum unique identifier (UID) can be generated by applying an algorithm to the data quantum file. As every byte of the value entry and the recording record entry are used as inputs in calculating the data quantum UID, and change to the value entry or the recording record entry produces a corresponding change to the data quantum UID. This change is according to the algorithm. As discussed above, this algorithm can comprise a hash function, the MD5 Message Digest Algorithm, or any other suitable algorithm.

In some implementations, the data quantum UID can be generated by applying the algorithm to the value file and is corresponding recording record file, instead of and/or in addition to applying the algorithm only to the value entry and the recording record entry.

In some implementations the data quantum UID can be generated using an empty digital memory buffer located on a computer-readable memory in communication with the computing device. Value entry bytes and recording record bytes are then written to and/or stored in the buffer. In some implementations, the whole data quantum file can be written to and/or stored in the buffer. Then the algorithm is applied to the contents of the buffer to generate the data quantum UID.

In some implementations, the algorithms generate a data quantum UID of a predetermined format (e.g. alpha-numeric string) and/or length (e.g. number of characters in the string) for any arbitrary value entry and/or recording record entry used as the input to the algorithm. The process of generating the data quantum UID can comprise performing complex calculations on input files (e.g. value files and recording record files) that can be arbitrarily large. As such, the skilled person would appreciate that such complex calculations would not be practicable without the use of processors in computing devices.

The generation of the of the data quantum UID is performed with a computational latency that is much shorter than would be possible if the generation (e.g. hashing) were to be performed manually or mentally. In some implementations, the computational latency can be two, three, or more orders of magnitudes shorter than any latency achievable manually. For example, the computational latency can be about 10 ms or shorter for generating a data quantum UID for a 10240 byte data quantum file and using the SHA512 algorithm running on an i686 processor with a 2400 MHz clock speed. In another example, the computational latency can be about 6.7 s or shorter for generating a data quantum UID for a 501820747 byte data quantum file and using the SHA512 algorithm running on an Intel i3 processor with a 2500 MHz clock speed. In some implementations, the computational latency can be between about 1 s and about 2 s for every 100 mega bytes of the data quantum file.

Generally, the computational latency can be a function of one or more of a size of the data quantum file, the computational complexity of the algorithm, and the processing speed of the processor applying the algorithm to the data quantum file. The skilled person would understand that generating the data quantum UID manually and/or mentally would be either impossible or take so long as to be impracticable. As such, the generation of the data quantum UID is performed using a processor of a computing device.

At the next step, at the computing device the data quantum UID can be associated with a data quantum file locator in a registration file. The associating can comprise, but is not limited to, saving the data quantum UID and the data quantum file locator in a common file, i.e. the registration file. The data quantum file locator can comprise, but is not limited to, a pointer to and/or a memory address of the data quantum file. In some implementations, the registration file can comprise the data quantum file itself instead of and/or in addition to the data quantum file locator.

Under certain conditions a data quantum can be comprised of value and recording record entries that are themselves data quanta. Under such circumstances, this subtype of a data quantum can be referred to as a hyper-data quantum. Like all data quanta, a hyper-data quantum can also be uniquely identified using an algorithm and can be associated with a registration file through a locator.

The method described above can provide increased security and efficiency in storing and communicating digital data. Regarding security, the data quantum UID can allow for detecting alterations of any one of the value entry and the recording record entry because any such alterations would produce a corresponding change to the data quantum UID according to the algorithm. If an earlier generated UID is different from a later generated UID, the conclusion can be drawn that one or more of the value entry and the recording record entry were modified between the earlier and later generations of the UID.

Regarding efficiency, the method described above can allow each data quantum to be packaged, stored, and communicated in a self-describing and self-authenticating package, e.g. a registration file. This in turn can obviate the need to transmit with the data quantum other security certificates or explanatory and/or contextual information. This, in turn, can produce increased network and communication efficiency.

While the steps of the method above, and the other methods described herein, are described in a particular order, it is contemplated that the steps can be performed in a different order than that described. In addition, it is also contemplated that in some implementations, one or more of the steps can be omitted from a corresponding method. Moreover, regarding the method steps described herein being performed on or at a computing device and/or involving a computer-readable memory, it is contemplated that one or more of the method steps can each be performed on a different computing device and/or using a different computer memory, so long as the different computing devices are in communication with one another and the different computer memories are accessible by one or more of the computing devices.

In some implementations, the method of atomizing and individuating data described above can further comprise the following additional steps: at the first additional step, the registration file can be stored in a repository located on a computer-readable memory in communication with the computing device. At the next step, the registration file can be indexed, the indexing configured to make the registration file findable in a search of the repository. In this manner, the data quanta associated with the indexed registration files can become more easily findable and accessible through a search of the repository.

At the next step, the registration file can be found in the repository; for example, by performing a search of the repository. Next, a second quantum data UID can be generated at the computing device by applying the algorithm to the data quantum associated with the found registration file. At the next step, at the computing device the second data quantum UID can be compared to the initially generated data quantum UID to determine if any one of the value entry and the recording record entry has been altered. If the initial and the second data quantum UIDs are different from one another, the conclusion follows that that one or more of the value entry and the recording record entry have been altered. Such alterations can be as small as a change in one bit of the bytes making up the value entry and/or the recording record entry. Alterations can come about as a result of multiple causes, including but not limited to tempering with or degradation of the data quanta.

In some implementations, the method of atomizing and individuating data described above can further comprise the following additional steps: at the first additional step, at the computing device a registration file unique identifier (UID) can be generated by applying a second algorithm to the registration file such that any change to the registration file produces a corresponding change to the registration file unique identifier according to the second algorithm. The second algorithm can be similar, and function in a similar manner to, the algorithm used to generate the data quantum UID. In some implementations, the second algorithm can be the same as the algorithm used to generate the data quantum UID.

At the next step, at the computing device the registration file can be associated with the registration file UID. The associating can comprise, but is not limited to, storing the registration file and the registration file UID in one file. The registration file unique identifier can allow for detecting alterations of the registration file. As described above n relation to the data quantum UID, any alterations to the registration file over a period of time can be detected by comparing a version of the registration file UID generated before that period of time to a version of registration file UID generated after the period of time. If the initial and subsequent registration file UIDs differ from one another, the conclusion follows that the registration file was altered over the period of time in question.

In some implementations, the registration file can also comprise additional data, which additional data can be different than the data quantum file locator and the data quantum UID. This additional data can comprise, but is not limited to, the type of algorithm used to generate the unique identifier; a standards protocol that specifies what type of information was recorded in the recording record and how; the registration authority overseeing the registration process; and the like.

In implementations where the data quantum UID is calculated by writing the value entry and the recording record bytes to a buffer, after applying the algorithm to the contents of the buffer to generate the data quantum unique identifier, a data quantum UID file can be opened and the data quantum UID can be stored in the data quantum UID file. In such implementations, associating the data quantum UID with the data quantum file locator can comprise the steps of: opening the registration file, and storing in the registration file the data quantum UID file and the data quantum file locator. In some implementations, the data quantum file itself can also be stored in the registration file instead of and/or in addition to the data quantum file locator.

In some implementations, after applying the algorithm to the contents of the buffer, the data quantum file can be modified to designate the data quantum unique identifier as a descriptor of the data quantum file. Examples of such a descriptor include, but are not limited to, a name of the data quantum file and an indexable attribute of the data quantum file. In this manner, the data quantum UID can be used to name, index, and/or search for the data quantum file.

In some implementations, the method of atomizing and individuating data described above can further comprise the following additional steps: at the first additional step, a second value file can be provided. This second value file can contain a second value entry comprising second value entry bytes. The second value entry can be related to the value entry.

At the next step, a second recording record file can be provided, the second recording record file containing a second recording record entry associated with the second value entry. The second recording record entry can comprise second recording record entry bytes. This second recording record entry can describe the relationship between the value entry and the second value entry. The value entry can be obtainable based on the second value entry and the second recording record entry. The second recording record entry can comprise a complete description of the transformation of the value entry that produced the second value entry, such that the value entry can be losslessly reproduced by applying to the second value entry the reverse of the transformation described in the second recording record entry.

For example, if the value entry comprises a digital image of a face with red eyes and the second value entry comprises the same digital image but with the red eyes corrected, the second recording record can comprise a complete record of the red eyes correction transformation such that the original digital image (with the red eyes) can be reproduced by applying to the red eye corrected image the reverse (and/or inverse) of the transformation described in the second recording record entry. This can allow subsequent transformations of the value entry to be fully documented and traceable to the original value entry. This, in turn, can allow the chain of subsequent related value entries to be secured from tampering and self-authenticating not only as to their value, but also as to their provenance.

In addition to the added security, the methods described herein can increase the efficiency for authenticating value entries since each value entry can be packaged in a data quantum with a corresponding recording record which can help in interpreting the value entry and a data quantum UID which can render the data quantum self-authenticating as to its value and provenance. Since no additional third-party certificates, documentation, or investigation is required to provide information as to the authenticity and provenance of the value entry of the data quantum, less information needs to be stored and transmitted in relation to the data quantum, thereby increasing the efficiency of data storage (i.e. a more storage efficient and self-referentially robust database structure) and data transmission (i.e. a more bandwidth efficient data encoding and transmission protocol).

In some implementations, the method of atomizing and individuating data described above can further comprise the following additional steps: at the first additional step, one or more additional data quantum files can be provided. Each additional data quantum file can comprise a corresponding additional data quantum. Each of the additional data quanta can comprise a corresponding additional recording record entry related to the recording record entry and a corresponding additional value entry. Since the additional recording record entries are all related to the recording record entry, these data quanta can represent a set or a block of data quanta which are related to one another in at least one aspect of the generation of their respective value entries. For example, if the value entries represent bytes of various digital MRI images, then the fact that each value entry is an MRI image would constitute a relationship between the recording records associated with each of those MRI image value entries, and the data quanta containing those MRI image value entries and their corresponding recording records would constitute a set or block of related data quanta.

In such an implementation, generating the data quantum unique identifier can comprise applying the algorithm to the data quantum and the one or more additional data quanta such that any change to any one of the value entry, the recording record entry, the corresponding additional recording record entries, and the corresponding additional value entries produces a corresponding change to the data quantum unique identifier according to the algorithm. In addition, the associating in the registration file can comprise associating in the registration file the data quantum UID with the data quantum file locator and the one or more additional data quantum file locators.

This can allow for generating a type of hyper-data quantum where a UID is calculated using all the bytes of value entries and recording record entries of a block of related data quanta. Generation, storage, and transmission of this type of hyper-data quanta can provide increased computation and data communication efficiency for at least two reasons: first, only one UID needs to be generated (i.e. calculated) for the block of data quanta, instead of calculating one UID for each data quantum in the block. This increases computational efficiency, while still providing the protection (from tampering) and self-authenticating qualities for the block of related data quanta. Second, during data storage and transmission, only one UID needs to be stored/transmitted for the whole block of data quanta, instead of storing/transmitting one UID for each data quantum in the block. This, in turn, increases data storage and transmission efficiency by reducing the amount of data that needs to be stored and/or transmitted when storing/transmitting the block of data quanta, while still providing the protection (from tampering) and self-authenticating qualities for the block of related data quanta.

While the above description addresses blocks of data quanta having related recording records, it is also contemplated that the process of generating one UID for a block of data quanta can also be applied to sets of data quanta that do not have related recording records or to sets of data quanta that are randomly and/or arbitrarily selected. In other words, blocks need not be comprised of data quanta having related recording records. Blocks can be comprised of data quanta that are grouped together according to any suitable rules, including but not limited to, being grouped randomly and/or arbitrarily.

According to another implementation of the present specification, there is provided another method of atomizing and individuating data. The method can comprise the following steps: first, a map data structure comprising keys and key entries can be populated with one or more value files each containing a corresponding value entry and one or more recording record files each containing a corresponding recording record entry associated with a corresponding value entry. The value entries and the recording record entries can comprise digital value entry bytes and digital recording record entry bytes respectively. The one or more value files can each be stored as one of the keys and the one or more recording record files corresponding to each value file can be stored as a corresponding key entry. The map data structure is located on a computer-readable memory in communication with the computing device.

At the next step, at the computing device a given key can be retrieved from the map data structure. The given key can correspond to a given value file. At the next step, at the computing device a data quantum file name can be created. The data quantum file name can correspond to a data quantum file.

At the next step, at the computing device the data quantum file can be opened, and then the given value file can be stored in the data quantum file. The data quantum file can be located on the computer-readable memory. In some implementations, the computer readable memory can be onboard the computing device. In other implementations, the computer-readable memory can be external to but in communication with the computing device.

At the next step, at the computing device a given key entry can be retrieved. The given key entry can correspond to the given key. The given key entry can comprise a given recording record file corresponding to the given value file. At the next step, the given recording record file can be stored in the data quantum file.

At the next step, at the computing device a data quantum UID can be generated by applying the algorithm to the data quantum file such that any change to the given value entry or the given recording record entry produces a corresponding change to the data quantum unique identifier according to the algorithm.

At the next step, the data quantum UID and a data quantum file locator associated with the data quantum file can be stored in a registration file located on the computer-readable memory.

In some implementations, this method of atomizing and individuating data can further comprise the following steps that can be carried on before the populating of the map data structure: first, a list data structure can be populated with the one or more value files each containing the corresponding value entry and with the one or more recording record files each containing the corresponding recording record entry. Each entry in the list data structure can comprise one of the one or more value files and its corresponding one or more of the one or more recording record files.

At the next step, all file names in the list data structure can be encoded using, for example, UTF-8 as the encoding scheme. This encoding can protect the value file names and the recording record file names during subsequent storage in and retrieval from the map data structure. In some implementations, instead of and/or in addition to encoding the file names, the files themselves in the list data structure can be encoded to protect the value entries and the recording record entries from being corrupted during subsequent storage in and retrieval from the map data structure.

Referring to FIG. 7, if the list data structure contains two or more sets of value files and corresponding recording record files, then the method can iterate over and/or through the list to encode each set of value files and its corresponding recording record files. Similarly, if the map data structure comprises two or more sets of keys and key entries, then the method can iterate over and/or through the key-key entry pairs.

The methods described herein can be performed by systems comprising a processor, a memory in communication with the processor, and a communication interface in communication with the processor. The processor can be configured to execute the steps of the methods described herein. Where the method steps describe providing a value file or a recording record file, the processor can be configured to receive those value files and/or recording record files from the communication interface. For example, where the value files and recording record files relate to digital photography, a Bluetooth™, USB, and/or other data transfer protocols can be used to send the digital image value entries and recording record entries from the digital camera via the communication interface to the processor of the computing device.

In other implementations, the processor can retrieve the value files and/or recording record files from a memory of the computing device, or from a remote and/or external computer-readable memory in communication with the processor. Similarly, data quanta files, UIDs, registration files, etc. can be stored by the processor on the memory onboard the computing device, and/or on a remote and/or external computer-readable memory in communication with the processor.

The method steps described herein can also be stored as computer-executable steps in computer readable media.

3.0 Description of Some Applications
3.1. Recognition of Retrieved and Analytically Transformed Values as Data Data analysis is an inferential deductive process which, for example, is aimed at estimating newly derived values through the transformation of retrieved values into deterministically derived analytical values. If those derived values are themselves the result of a transformation that is clearly documented and can be reproduced, then they can be considered an extension of previously recorded values in such a way that the retrieved and transformed values can be recorded as data quanta. Whenever any value is to be used for whatever purpose as input data guiding a decision making process, the validity or that value as being what it is assumed to be can be checked. In addition, this method can simplify how data is treated. There no longer is a need to create separate databases and registration procedures that distinguish between primary and secondary or meta data. Rather, there is only data and not-data. That discrimination between data and not-data is determined by the ability to: 1) access and interpret the recording record associated with a value and 2) judge how that recording record supports the value. Both of those tests are facilitated by a data atomization process. For example, that test for distinguishing between data and not-data can be carried out at a later time when an unintended or poor quality result of a decision based on prior data analysis is detected and there is a need to analyze whether the original data analysis used to justify that decision was flawed in some way. It can also be carried out at the time the value is used in a decision making process as part of a checklist system to reduce unintended errors in the data recording registration and use process.

3.2 Facilitating Digital Rights Management

The recording record of a data quanta can be organized to assist in the process of managing digital rights associated with data ownership, licensing and-or citation needs. Each original recording event or episode will generate digital content, made up of recorded values, over which digital rights can be asserted. This will be true especially if that content can be shown to be different from all other recording of that type and others seek access or use of that content because of those differences. As a result any derivative use of that data can be copyright protected in a way asserted in the recording record. For example, intent concerning re-use of data that is owned by a person or group, as welt as licensing options and copyright assertions, can be built into recording record entries. Likewise, the data atomization process facilitates citation of research data so that original sources of data can be located and sharing of that research information facilitated with all the benefits that accrue from that practice.

All of the criteria for citation of data recommended by the Joint Declaration of Data Citation Principles (JDDCP; see Starr et al. (2015), Achieving human and machine accessibility of cited data in scholarly publications. Peer J. Comput. Sci. 1:e1; DOI 10.7717/peerj-cs.1) can be applied at the atomized data quantum level. The framework for implementing the JDDCP recommended by Starr et al 2015 provides a road-map for constructing a recording record to accompany each measured value upon which conclusions are made that are based on interpreting the results of a given set of experiments or observational trials.

Indeed data atomization can enable an Ato-Publication strategy for promoting open science and data replication. The concept of a nano-publication refers to a service where a portion of a published paper like a graph or an image or a table is given a unique identifier. These nano-publications are indexed and published to a registry where that subsidiary part of a publication can be located and retrieved through references or citations found within the nano-publication file. However, the concept of nano-publication is limited because it requires access to the full publication in order to interpret such nano-publications.

Figure 10:
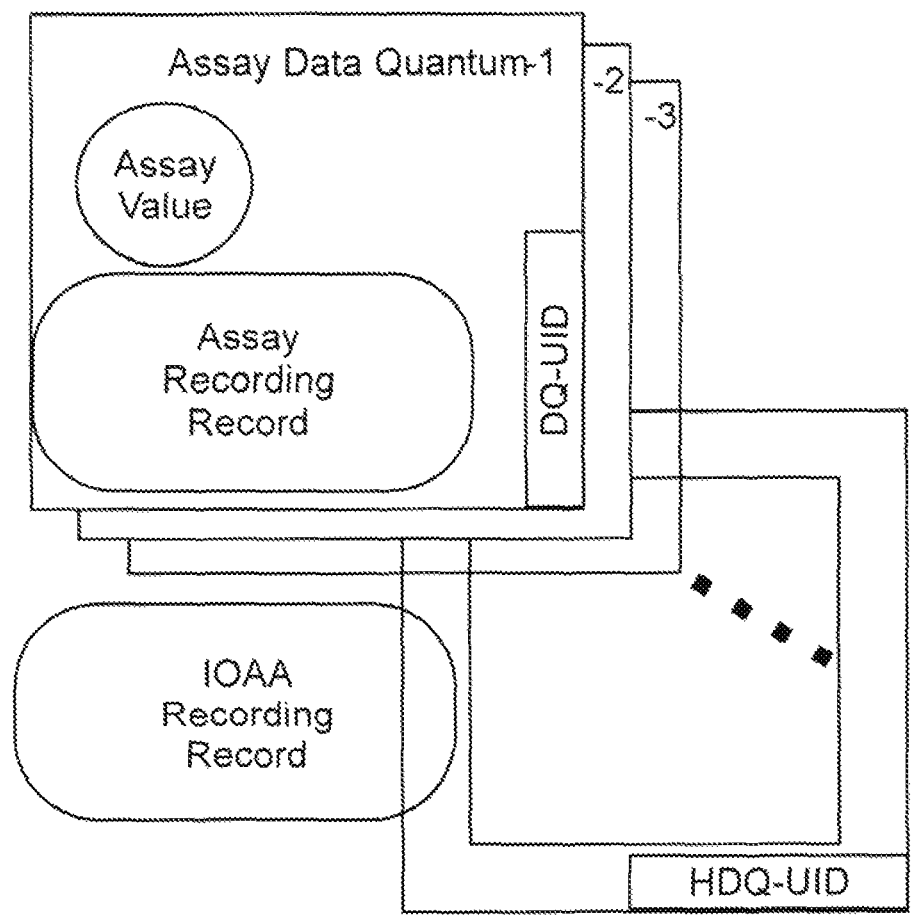
FIG. 10 shows schematically an inside-out assay article hyper-data quantum, according to non-limiting implementations.

Atomization of all of the data upon which the full publication was based, can be accomplished by associating every section of text, and every illustration like an image or a graph, as a value whose production can be described by a recording record that also, optionally, provides reasons for why that part of the publication was included in the whole publication. An "Inside-Out Article" publication product line is being developed around submission concerning experiences with common assays used in cell and molecular biology. It is called Inside-Out Assay Articles (IOAAs) and builds on the hyper-data quanta methodology. FIG. 10 shows how the articles in this IOAA can be published in the form of a hyper-data quantum.

A hyper Data Quanta is generated by associating assay data quanta referencing all elements of a research assay including the raw data carried out by a particular individual. Those raw data make up the value field of the data quanta and the recording record is made up of discrete entries describing methodology, results, discussion and conclusion.

What distinguishes this IOAA publication from other publications is that each value discussed in the article has its own recording record that is created as soon as the value was generated by a particular individual. The editor of this article selects from a series of submissions concerning particular experiences with an assay by a variety of people using a variety of reagents all using the assay for a variety of reasons under different contexts.

These data quanta are organized into a hyper-data quanta published as an IOAA. The recording record for this hyper-data quantum is an editorial-review hybrid that discusses how the assay can be used effectively and what can go wrong. All of the atomized data-quanta associated with the article are uniquely identified, registered, and indexed as subsidiary data quanta. The primary hyper-data quanta IOAA is identified with a document identification number that is linked to the HDQ-UID for that hyper-data quanta.

A series of such IOAA organized into a review publication will be called a Systematic Translation of Assay Trials (STATs). This is being designed a series of structured summaries of a variety of IOAAs exploring assay reliability, reproducibility, resiliency and adaptability. The IOAA and STATs products will be complemented by an interactive web site enabling contributors to use IOAA and STATs findings to justify contributor instantiated modification of assay protocols demonstrating improvements over best practices. That product will be referred to as Build Assay Stories Here (BASH). Dialogue between authors, reviewers and editors concerning IOAA, STATs and BASH publications products will be fostered in order to develop another product called Assay Coherence Transactions. Articles in that publication will aim to a proposed re-consolidation of assay best-practices. We call this approach to atomizing descriptions of scholarly empirical work an Ato-Publication system. These data centric Ato-Publication products and their relationships are shown in FIG. 11.

Data quanta and data hyper-quanta can be used for the accession, registration, indexing and making accessible the raw data justifying the knowledge built within those publications. The Ato-Publication system shown in FIG. 11 illustrates the recursive nature of the data atomization approach described here.

Data quanta regarding different aspects of either the same assay of groups of related assays can be indexed and references to those records of note as raw data. When these are indexed and organized into searchable repositories such that citations can be resolved to locations where the desired data quantum or hyper-data quantum can be retrieved and examined, a program for executing on demand data sets can be generated to explore a particular topic related to those collections. For example, the data set can be focused on instrumentation, or interpretations, or instrumental variability in outputs associated with application of the assay in similar contexts, or ways of adapting the assay to new contexts. If will be evident to those trained in the art that all or part of that retrieval process can be automated such that repositories can be searched and mapped systematically.

Another type of data publication industry that could benefit from the invention described herein is the music industry. Data quanta can be constructed where the value is a complete audio visual recording of a music performance by a particular performer that occurred at a particular place and started and ended at particular times. Alternatively, the recording can be assigned a value along an ordinal scale concerning the artistic value of the performance as judged by a jury which in turn can be linked to an economic scale concerning the monetary value of the performance as judged by a willingness to pay for the recording by collectors. By atomizing the record and making it tangible via the unique identification of the bytes associated with the original recording, a limited edition publication of a performance record approved by the performers and others involved becomes possible, and unauthorized copies can be more easily distinguished from authorized collector edition copies.

Proposed standardization of data citation practices such as discussed by Starr et al. (2015) points a way to build instrumentation that can automatically ensure that full citations are produced for every data point recorded. This will be useful as scientific and regulatory publications struggle to establish a regime of full accountability with the goal of improving result reproducibility. Those goals are reflected in a number of non-commercial data publication initiatives that can benefit from the invention.

For example, a number of open data initiatives, ranging from university based projects like Dataverse and DSpace to government based projects like open.gov to researcher based projects like the Research Data Alliance, are promoting the practice of sharing and re-using data by using the internet to make it more readily available and accessible. They are facing a challenge exemplified by the bioCADDIe business model of developing data discovery index (DDI) prototypes that will index data stored elsewhere. The invention described herein can promote data integration by facilitating alignment to common data elements and high level schemas. This will allow users of data sets and of transformed data set products to proceed with greater confidence and in a registered manner as they attempt to justify beliefs, decisions and actions using that data and thereby to assign meaning to data collected, recorded and stored at great cost.

3.3. Large Blocks or Sets of Data Quanta to being Dis-Aggregated and Re-Synthesized into Other Blocks or Sets of Data Data quanta can be re-used and re-purposed in ways that can be the same or different from the original purpose for creating and registering the data quanta. Indeed new blocks of data quanta derived from the other blocks of data quanta can be synthesized in a manner such that all originating data quanta can be located or make up an integral part the new data blocks or sets. As a result t the synthesis process that led to aggregating data quanta to warrant a particular claim can be reproduced or re-evaluated and the quality of that process assessed at a later time. If needed, the recording record and values of the source data quanta cart be retrieved and examined.

This reduces information asymmetry. It allows creation of a block of data quanta that is also a chain of data quanta. One way of accomplishing this implementation is to make use of the BioTIFF container.

For example, within the healthcare setting many diagnostic tests carried out as a component of standard of care protocols. These tests are used to monitor progress of on-going therapy. Often nothing alarming is found or recognized. However, if these diagnostic test values were stored in an electronic medical record where the metadata associated with every recorded entry was recorded in the form of registered and indexed data quanta then it would be much easier to authorize meta-analyses of patterns and trends in the data. In a sense data-atomization allows definition of hyper-dimensional spreadsheet cells where the value in a given cell is linked to a variety of qualifying information, where all of that qualifying information holds in common the value in that cell and the unique set of circumstances to lead to its instantiation.

3.4 Use in Procedures Aimed at Reducing, Reusing and Recycling Digital Data of all Types in a Secure and Trustworthy Manner Creation and registration of data quanta and hyper-data quanta will increase trust in the validity of the data. It can ensure that when a given data quanta is recorded, it is done in such a way that each such unit is indelibly materialized, identified and registered so as to signal its composition and its integrity. The method and system allows precise and accurate copies of, or references, or citations to, the original data quanta. As a result the entire data quanta do not need to be available at the computer where a data quanta repository is available for search and retrieval of data quanta associated information.

In that way, source data quanta can be stored as record of note in a secure and stable environment and derivative or subsidiary data can be made available for analysis and exploration. Only when a conclusion needs to be made do the originating data quanta need to be accessed to verify that there has been no unintended alteration of the data used to arrive al a conclusion or a decision. Indeed, that verification can happen at any time before or after a conclusion or decision has been made.

For example, it will allow users to deduce vulnerabilities before or after breaches in trust so that such breaches can be prevented in the future. Reports concerning attacks against digital recording media and against the computer BIOS (Basic Input/Output System) highlight and support the need for being able to analyze whether data corruption has occurred and to use that analysis to recover or reproduce lost data. It will now be understood then that unless a recording record is always available for each value in a data set being analyzed, then there will inevitably be cases where what was thought to be data analysis was actually not-data analysis. Storing data as data quanta enhances data usability and security.

Digital recording of data makes it easier to transpose information from one format to another, or one location to another, or one use to another. It does so by reducing record keeping failure. During initial storage of this information or its subsequent transformation, key knowledge about how that information was generated can be lost, making it harder to determine if the recorded value is what it is supposed to be. Even if that information can be recovered, that process can be costly. The systems and methods described here teach how a data quanta atomization process can guard against such record keeping failures. The data quanta atomization process can also facilitate the retrieval, re-discovery and re-purposing of any data quantum.

Another problem with electronic records is that there are various exploits possible for stealing them or accessing archive files in an unauthorized manner and modifying them. There are various procedures such as using a hardened operating system to reduce the chance that this has occurred. Increase confidence in the data can be derived by being able to verify that data quanta were captured and stored on systems build using hardened operating system and hardware.

Problems of trust will limit access or interpretation of the data. Real or perceived conflicts of interest arising from profits derived from carrying out the tests will lead to wasted energy in producing unnecessary new tests and maintaining multiple redundant records. For example, the health records associated with any given person are represented in multiple health records systems distributed over multiple institutions and locations. That arrangement reflects the way that current healthcare delivery is reimbursed rather than what is in the patients' best interests. A more efficient alternative might be to use a single personal health record created in the patient's name and managed by and for that person, autonomously from the various institutions and health professionals providing health services to that person.

A regulatory authority could create a data quanta repository to receive data quanta containing data concerning any given medical procedure under its jurisdiction. In one scenario, the value part of the data quanta could be a billing number submitted to recoup the expense to the hospital that hosted the procedure. The recording record could be all of the information collected by the hospital to justify that bill as well as DQ-UID pointers to all the data quanta recorded that had some relation to that procedure for other reasons such as quality control or educational or scientific research purposes. This data could also be released to the patients for their information and use. Currently many electronic medical record systems have patient portals that allow patients to view data about themselves in an institutional electronic medical record system.

3.5. More Efficient Use of Data

Data that results from standardized and often proscribed tests, is the new natural resource of the $21^{st}$ century. It is generated at great costs. Indeed, it has been estimated that one third of the world energy production is used in data creation. Data is often wastefully produced for single use purposes. Routine data atomization and preservation within a data quanta-based format makes data mobilization more efficient.

For example, in the healthcare system a diagnostic biological sample like a throat swab or a cancer biopsy, or a diagnostic image like an X-ray or an MRI scan can be collected for diagnostic purposes and analyzed to generate data that will guide and justify decisions regarding which particular courses of treatment is warranted at a particular time for a given patient. In addition to that single purpose usage, that data also can be used to track the epidemiology or evolution of treatable conditions and used more collaboratively in ways that reduce the need for multiple tests while increasing efficiency and effectiveness of treatment at a population level. That data further can be re-used by government agencies or companies in monitoring the cost-effectiveness of a particular therapy.

3.6. Use in Registering, Verifying and Qualifying Instrumental Values

The idea of atomized data, can be represented by an example. Consider a computer controlled sensor area that measures some parameter and transforms it into a digital value. A data value generated by illuminating or irradiating a sub-area of that sensor or even a single pixel will generate a digital value that represents the sensed energy. A number of specific examples can be considered using this type of data recording.

Values resulting from instrumental measurements are characterized as being a precise output of a reliable instrument with known instrumental errors and artifacts. Sometimes, those errors are compensated for by internal filters or correction. For example sometimes a white balance correction factor is applied to an image to make the image more similar to the perceived scene or a Bayer filter algorithm is applied to the RGB output of a color camera sensor. Sometimes lossy compression is applied to the image to reduce the size of the image file. With each such transformation information is lost. Indeed many hobbyists and professionals prefer to capture images as large raw files to which deliberate filtering and transformation can be applied to generate a more pleasing or satisfying image.

The data quantum approach to recording and registering data is analogous to that preference of recording image data in a raw image file format where as much information about how the image was captured is stored within the image file. In many cases there is no industry standard for creating "raw" data files. The data quanta approach allows such standards to be specified.

In many cases data archives are set up to register surveillance data of this type to be examined at a later time. Considerable resources are expended to maintain the quality of the data in such an archive. Atomizing that data would reduce those costs.

Consider an archive created from registering satellite records of gamma ray particles coming from particular quadrant of space at a particular time. Although no two gamma ray particles will be the same in terms of energy or origin, information about how the sensor was calibrated and positioned can be recorded so as to convince users that it will be able to record gamma ray particles with describable accuracy, precision validity and replicability. For example artificially generated gamma ray particles can be used to specify those measurement capabilities on different satellite sensors.

Generally an archive of such data consists of energy levels measured as a value, a representation of astronomical time and space coordinates that its origin has been mapped to. Usually, information about how to correct for known and expected distortions and to convert into standard units are also provided in another file stored at another location. There can also be information about variations in sensitivities between different sensors as sensor technology advances. Gamma ray recording made by US space satellite can be accessed through the archive systems of NASA's High Energy Astrophysics Science Archive Research Center. In principle that database could be atomized using the systems and methods described here. In order to atomize data quanta from such an archive, each of the nominal energy levels and coordinates of origin would be copied into data quantum files that also contain a reconstructed recording record such that each data quantum can be evaluated on its own regardless of how it is subsequently encountered. This process is represented schematically in FIG. 11.

Because a self-identifying data quantum can be repeatedly used and copied to new locations without degrading its believability (provided it is protected from corruption and degradation through authenticity checks), the burden of maintaining data integrity and of confirming uncorrupted distribution is lessened. There is also a capacity to add new correction factors to the raw values as new information about distortions emerge.

Figure 12:
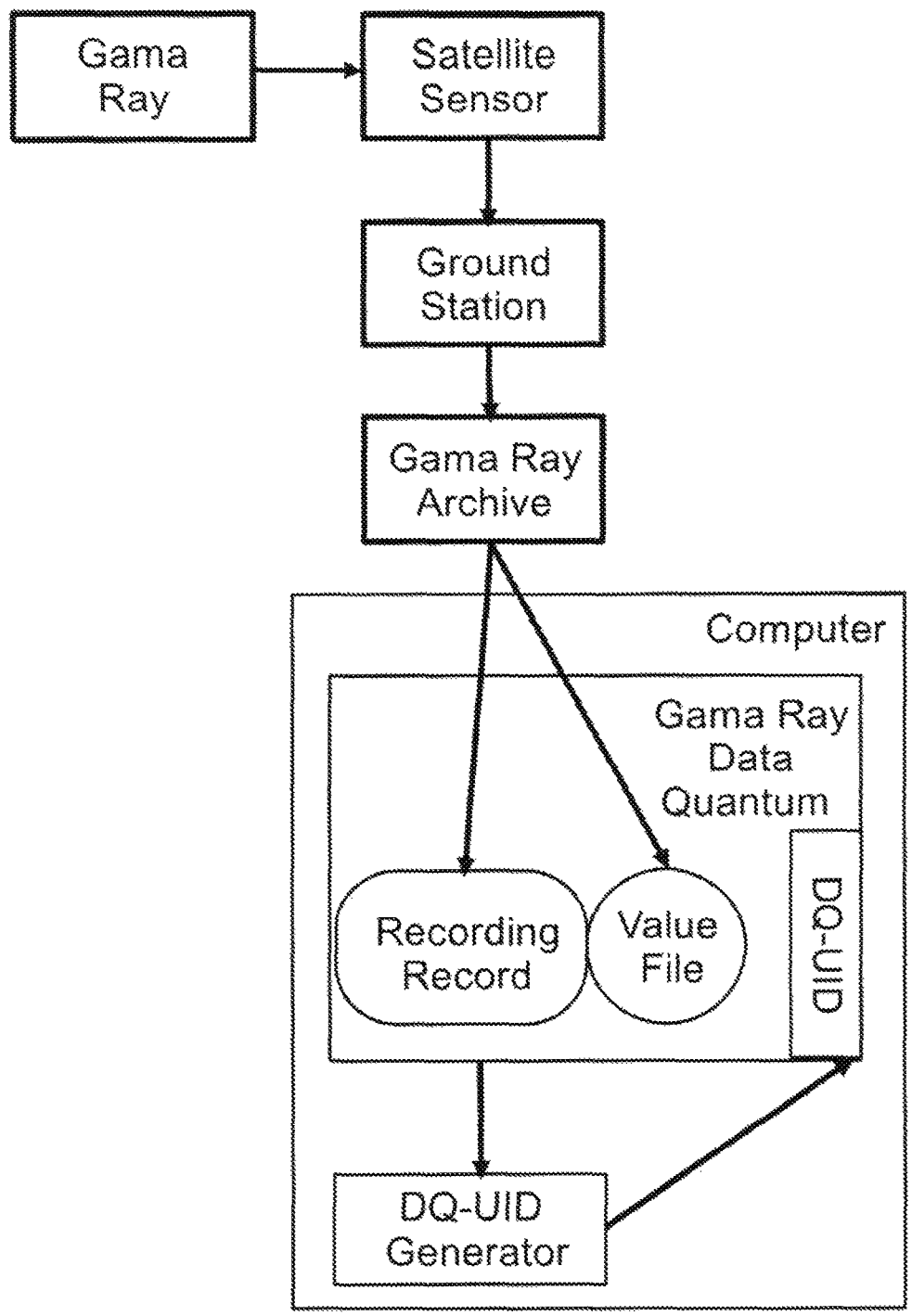
FIG. 12 shows schematically data atomization of an existing data repository, according to non-limiting implementations.

Consider the situation when ionizing radiation, such as gamma ray particles, is used in intensity modulated radiation therapy for cancer. A German company called iRT distributes a device marketed as the Internal Quality Monitor (IRM) device that can be positioned between the final beam shaping device and the patient can be used to verify that the appropriately modulated radiation pattern is delivered to the appropriate patient in an appropriate way. FIG. 12 provides a schematic illustration of how the method can be applied within this system. It shows how a recording record associated with an aberrant value of output radiation or associated with routine quality monitoring can be stored in a repository of data quanta and used to deduce what went wrong or right as part of a quality control system. For example, it can also be used to adjust subsequent exposures to radiation given the unanticipated level of exposure. This is a form of a quality system.

Figure 13:
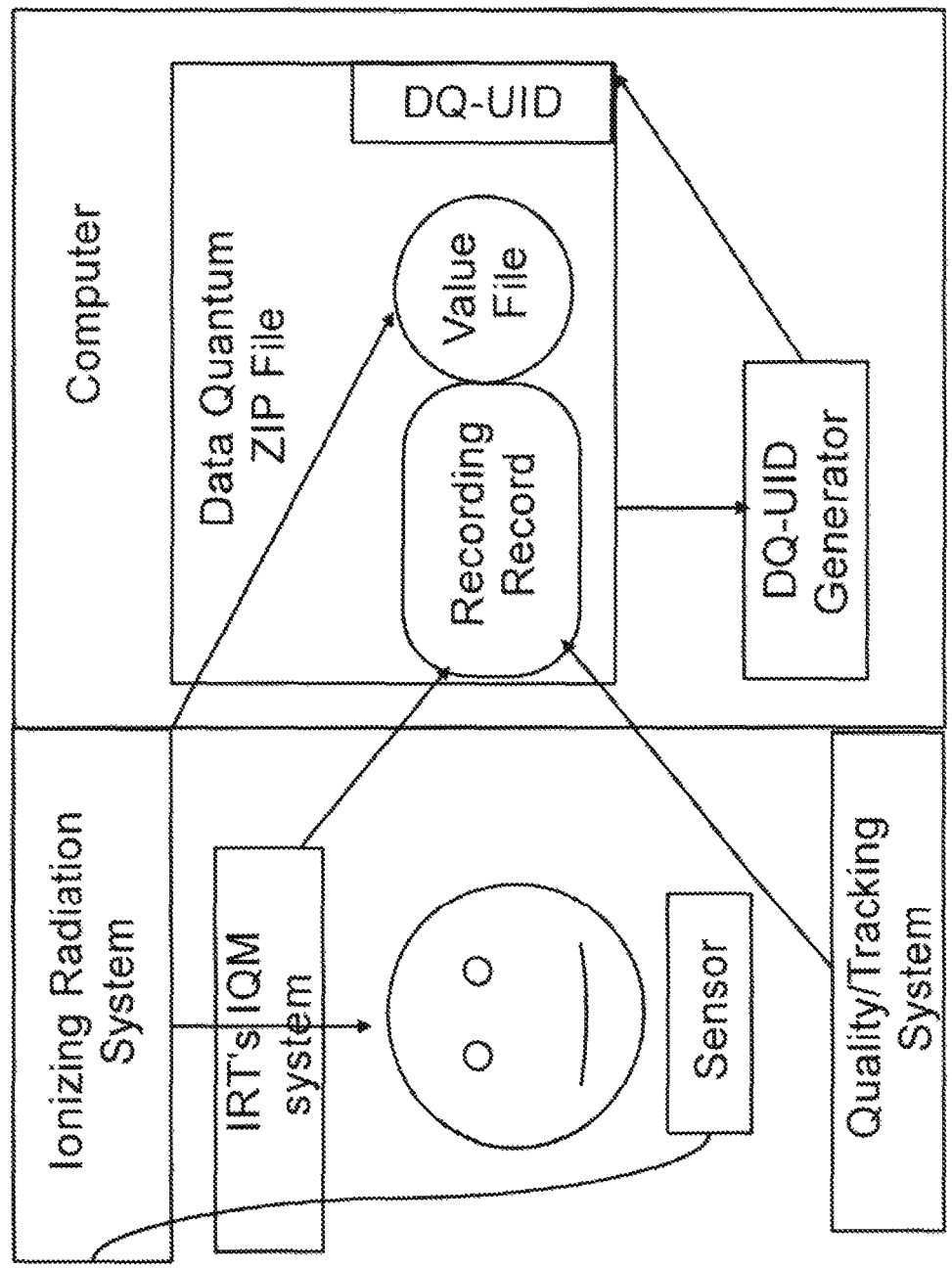
FIG. 13 shows schematically a quality/tracking system for radiation therapy, according to non-limiting implementations.
Figure 14:
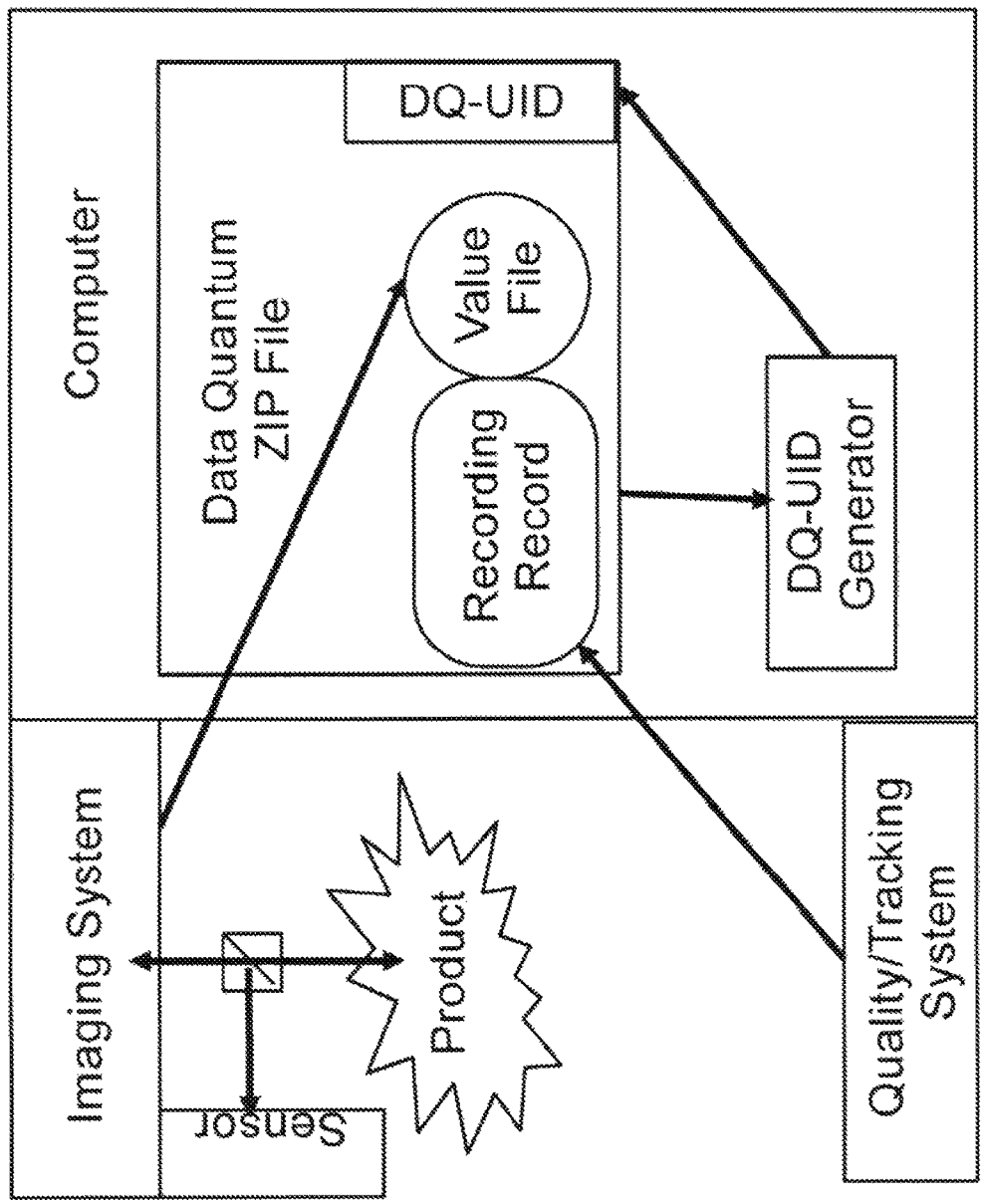
FIG. 14 shows schematically an image based quality/tracking system for manufactured products, according to non-limiting implementations.

FIG. 13 shows how an analogous system can be applied for monitoring the light output of the illumination device that is part of the light based imaging system. In that case an optical path would be designed to detect a representation of the optical illumination signal to a camera sensor for illumination quality monitoring purposes. Again a data quantum would be produced where the value was related to the quality system method applied and the recording record would contain information about how the value was arrived at. Another quality control application that can be associated with registering the selection and distribution of a medicine or a food product. A detailed image of a particular unit of distribution of said medicine or food, optionally augmented by vibrational spectroscopy signatures derived from the same imaged area, can help to uniquely identify the product as it travels through unit product supply chain, including but not limited to the initial creation of the unit, packaging, shipping, receipt, consumption or disposal. Here the material properties of the product allow for the sensing of a unique set of properties that have been registered and serve as a unique identifier of that product. FIG. 14 provides a schematic representation of this process.

In all of these examples access to a raw file concerning the instrument or instrument component output allows the accuracy of the represented instrumentally measured values to be understood and taken into account when the measurements need to be interpreted.

3.7. Use in Registering, Verifying and Qualifying Hermeneutic and Fuzzy Data

As described in implementation 3.2 where a performance is copyrighted, the value and artistic merits may not be resolvable to a value that is the product of an instrumental procedure. In contrast to instrumental data, hermeneutic data is not an inevitable outcome of a method. Hermeneutic or interpretive data is qualitative data that has meaning that is constructed through its interpretation within a certain philosophical or methodological stance.

Nevertheless, the qualitative data in which hermeneutic interpretations are grounded concern specific phenomena and are recorded in a describable manner using a systematized method that can be described by a recording record. Hence, even hermeneutic data can be individuated through atomization into data quanta. A hybrid between instrumental and hermeneutic data is fuzzy sets of data defined semantically using membership functions.

One example of a type of data value could be one measured via a fuzzy nominal scale (see Benoit E and Foully L (2013). The role of fuzzy scales in measurement theory Measurement 46(8):2921-2926. doi:10.1016/j.measurement.2013.04.043) For example, a particular color or hue or other color appearance or physical parameters can be more precisely specified using a fuzzy nominal scale derived piecewise through triangulation within fuzzy subsets of a colorimetric space. That combination can be precisely defined and registered as part of a brand or a quality indicator. Indeed it can be precisely recognized in authorized and non-authorized versions of products.

Each of these values can be recognized as a stored data quantum that can be synthesized into a new data quantum on demand and as a series much like an original print can be created and registered. For example, by atomizing the record and making it tangible via the unique identification of the bytes associated with the original recording, a limited edition publication of a performance record approved by the performers and others involved becomes possible, unauthorized copies are easily distinguished from authorized collector edition copies.

3.8. Use in Increasing the Value and Reducing Cost Associated with Managing and Searching Large Sets of Diverse Data There has been much discussion concerning the economic value of Big Data, and of the Internet-of-Things (IoT). Big Data refers to the inability of traditional data architectures to efficiently handle new data sets made possible by computerized automation of data recording processes and the massive increase in our capacity to store recorded data. Characteristics of Big Data that force new ways of dealing with data are the characteristics of volume (i.e., the size of the data set) and variety (i.e., data from multiple repositories, domains, or types), and the data in motion characteristics of velocity (i.e., rate of flow) and variability (i.e., the change in velocity).

Traditional providers of large centralized capital intensive services have latched on to the reassuring concept of cloud storage of big data. However, it is possible that much of what is deemed to be stored in these cloud storage services is not data according the definition supplied above where both values and recording records must be associated for a value to become data.

The IofT concept refers to the idea that since most manufactured things can now be associated with digital sensors, that can monitor states and of those things and share those values through communication protocols such as Internet protocols, then new and useful ways of networking information about the states of things are now possible. Now natural things, including human beings, are also being associated with sensors that allow collecting of data regarding their health and well being so as to better manage activities aimed at optimizing those attributes. Management of types of precisely customized and personalized therapeutic interventions are being informed by sensor and instrument generated data.

In the case of both manufactured and natural things, large volumes of a wide variety of data values are being generated at high velocity that varies according to conditions and needs. It is evident that a method is needed to handle the large amount of largely unstructured data of things that will be generated through IoT applications and analyzed through Big Data applications. Systems and methods for atomizing data described herein can be applied in those domains.

Figure 15:
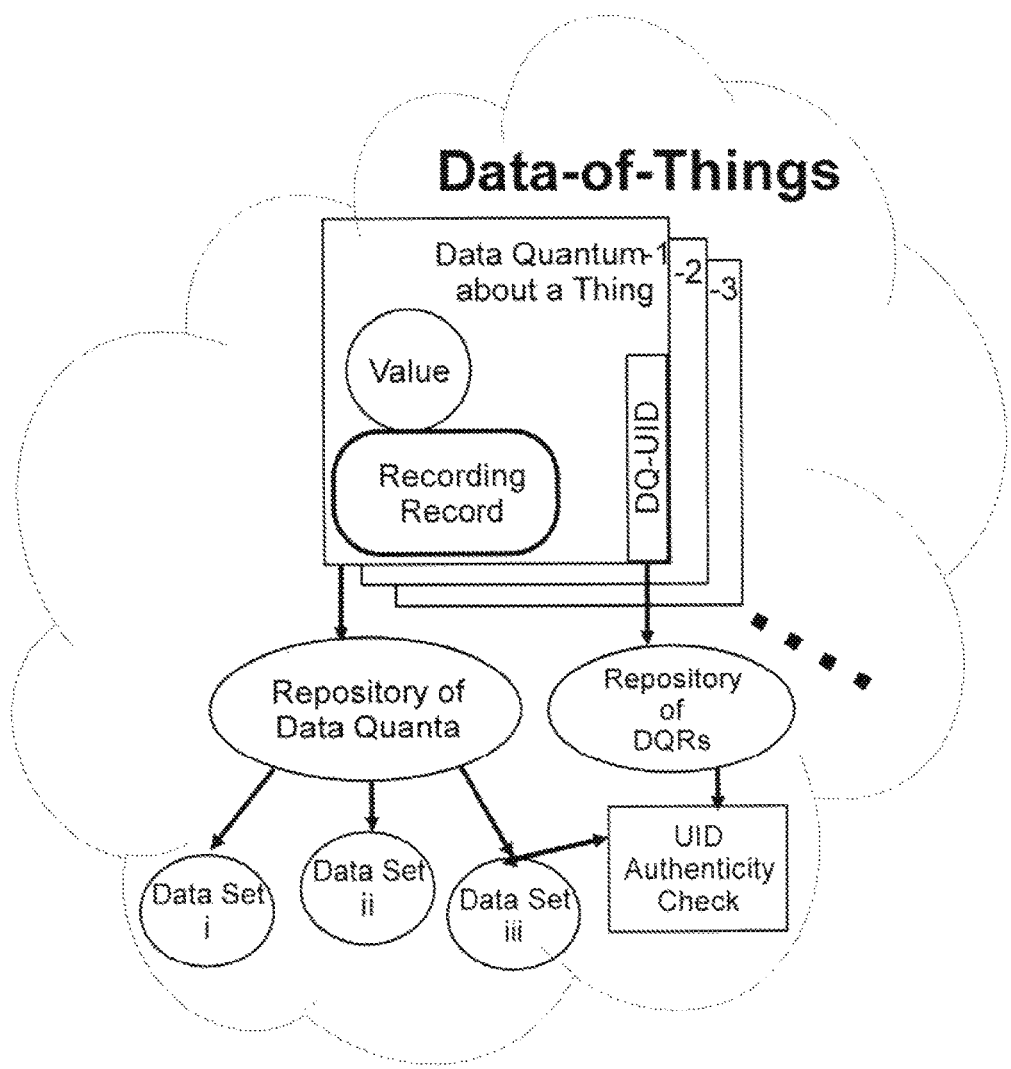
FIG. 15 shows a schematic representation of a Data-of-Things contribution, according to non-limiting implementations.

More constrained but still complicated sets of small data, related to an individuated object such as a particular therapeutic product, or a particular person engaging with the healthcare system, can also be atomized into data quanta. By only recording the data quantum once and using network technology to give permission to inspect it, the data can be recycled for particular purposes in ways that reduce the need to copy or regenerate the data. This can reduce energy consumption normally directed at those activities. Rather than conceptualizing the challenge as being one of creating an Internet of Things, the challenge can be re-conceptualized as a network of Data-of-Things FIG. 15 provides a schematic representation of this concept.

What is claimed is:

1. A method for creating a file containing a unit of data having a sub-set of pixel values from an image file generated by an image recording device, the image file being the result of a specific recording event, the sub-set of pixel values being associated with a recording record, the recording record containing detailed entries of how the sub-set of pixel values were generated, including timing and location entries, the method comprising the steps of:

Generating a unique data quantum file;

Generating a value file and copying into the value file the sub-set of pixel values;

Generating a recording record file and copying into the recording record file the recording record corresponding to the sub-set of pixels;

Generating a buffer populated with the bytes contained in the value file and the recording record file;

Generating a unique data quantum identifier by applying a cryptographic hash algorithm to the buffer contents;

Appending the value file, the recording record file and the unique data quantum identifier with the unique data quantum file;

The unique data quantum identifier and the unique data quantum file configured to permit the unique data quantum identifier to be recalculated using the same cryptographic hash algorithm to verify that the unique data quantum file contents are the same as when the unique data quantum identifier was first placed in the unique data quantum file, and Closing the unique data quantum file and storing it on a digital storage medium.

2. The method of claim 1 wherein the recording record file further contains detailed entries as to why and how the specific sub-set of pixel values were recorded.

3. The method of claim 1 wherein the data quantum file is in one page of a BioTIFF file.

4. A method for creating a file containing a unit of data comprising a sub-set of word values from an audio file generated by an audio recording device, the audio file being the result of a specific recording event, the sub-set of word values being associated with a recording record, the recording record containing detailed entries of how the sub-set of word values were generated, including timing and location entries, the method comprising the steps of: Generating a unique data quantum file;

Generating a value file and copying into the value file the sub-set of word values;

Generating a recording record file and copying, into the recording record file the recording record corresponding to the sub-set of word values;

Generating a buffer populated with the bytes contained in the value file and the recording record file;

Generating a unique data quantum identifier by applying a cryptographic hash algorithm to the buffer contents;

Appending value file, the recording record file and the unique data quantum identifier with the unique data quantum file;

The unique data quantum identifier and the unique data quantum file configured to permit the unique data quantum identifier to be recalculated using the same cryptographic hash algorithm to verify that the unique data quantum file contents are the same as when the unique data quantum identifier was first placed in the unique data quantum file, and Closing the unique data quantum file and storing it on a digital storage medium.

5. The method of claim 4 wherein the recording record file further contains detailed entries as to why and how the specific sub-set of word values were recorded.

6. The method of claim 4 were the sub-set of word values comprise an element of a qualitative evaluation, spoken or written by a commentator.

7. The method of claim 4 wherein the unique data quantum file is in one page of a BioTIFF file.

8. A method for creating a file containing a unit of data comprising a sub-set of values from a recording file generated by a recording device, the recording file being the result of a specific recording event, the values being recorded as bytes, the sub-set of values being associated with a recording record, the recording record containing detailed entries of how the sub-set of values were generated, including timing and location entries, the method comprising the steps of:
Generating a unique data quantum file;
  Generating a value file and copying into the value file the sub-set of values;
  Generating a recording record file and copying, into the recording record file the recording record corresponding to the sub-set of values;
  Generating a buffer populated with the bytes contained in the value file and the recording record file;
  Generating a unique data quantum identifier by applying a cryptographic hash algorithm to the buffer contents;
  Appending the value file, the recording record file and the unique data quantum identifier so that it becomes a unique data quantum file;
  The unique data quantum identifier and the unique data quantum file configured to permit the unique data quantum identifier to be recalculated using the same cryptographic hash algorithm to verify that the unique data quantum file contents are the same as when the unique data quantum identifier was first placed in the in the unique data quantum file, and
  Closing the unique data quantum file and storing it on a digital storage medium.

9. The method of claim 8 wherein the recording record file further contains detailed entries as to why and how the specific sub-set of values were recorded.

10. The method of claim 8 wherein the unique data quantum file is in one page of a BioTIFF file.

11. The method of claim 8 were a unique data quantum registration file is created from the unique data quantum file, the method further comprising the steps of:
  Storing a unique data quantum file in a data storage repository located on a computer-readable memory in communication with a data storage repository located on a computer-readable memory storing unique data quantum registration files;
  Generating a unique data quantum registration file containing the location of the unique data quantum file in the unique data quantum file repository and its corresponding unique data quantum identifier;
  The unique data quantum registration file further containing a unique data quantum registration record file specifying additional registration entries to make the unique data quantum registration file and its associated unique data quantum file findable and retrievable as well specifying timing and location entries concerning the creation of the unique data quantum registration file;
  Generating, a buffer populated with the the location of the data quantum file, the unique data quantum identifier and the unique data quantum registration record file;
  Generating, a unique data quantum registration identifier by applying a cryptographic hash algorithm to the buffer contents;
  Generating a uniquely identified unique data quantum registration file by appending the unique data quantum registration identifier with the unique data quantum registration file;
  The unique data quantum registration identifier and the unique data quantum registration file configured to permit the unique data quantum registration identifier to be recalculated using the same cryptographic hash algorithm to verify that the unique data quantum registration file contents are the same as when the unique data quantum identifier was first placed in the unique data quantum registration file, and
  Closing the unique data quantum registration file and storing the unique data quantum registration file in the unique data quantum registration file repository.

12. The method of claim 11 further comprising the steps of:
  Finding the unique data quantum registration file in the repository;
  Locating the unique data quantum file specified by the unique data quantum registration file;
  Copying the unique data quantum file value file bytes and the unique data quantum recording record file bytes of the located unique data quantum file to a buffer on the computing device;
  Copying the location of the unique data quantum file, the unique data quantum identifier and the unique data quantum registration record file from unique data quantum registration file to another buffer on the computing device;
  Generating, a recalculated unique data quantum identifier and a recalculated unique data quantum registration identifier by applying a cryotographic hash algorithm to the contents of the two buffers;
  If the recalculated unique data quantum registration identifier is the same as the unique data quantum registration identifier in the data quantum registration file, verifying that the content of the data quantum registration file is the same as when the unique data quantum registration identifier was first placed in the unique data quantum registration file;
  If the recalculated unique data quantum identifier is the same as the unique data quantum identifier in the data quantum registration file and in the located data quantum file, verifying that the contents of the located data quantum file is the same as when the located unique data quantum identifier was first placed in the unique data quantum registration file.

13. The method of claim 12 further comprising creation of a cumulative hyper-data quantum registration file containing a plurality of uniquely identified data quantum registration files each containing registration data for individual uniquely identified data quantum files, where a cumulative hyper data quantum file unique identifier is calculated each time a unique data quantum registration file in added, the method further comprising of the step:
  Associating a unique data quantum registration file in the hyper data quantum registration file;
  Populating a buffer with all of the unique data quantum registration identifiers associated with the hyper data quantum registration file;
  Generating a cumulative hyper-data quantum registration file identifier by applying a cryptographic hash algorithm to the buffer contents;

Append the cumulative hyper-data quantum registration file identifier to the hyper data quantum registration file;

The cumulative hyper-data quantum file identifier and the hyper data quantum registration file configured to permit the cumulative unique data quantum registration identifier to be recalculated using the same cryptographic bash algorithm to verify that the hyper data quantum registration file contents are the same as when the unique hyper data quantum registration file identifier was last placed in the data quantum file, and Closing the uniquely identified hyper data quantum registration file and storing it on a digital storage medium.

14. The method of claim 13 wherein the hyper data quantum file is stored in one page of a BioTIFF file.

* * * * *